(12) United States Patent
Reed et al.

(10) Patent No.: US 11,982,196 B2
(45) Date of Patent: May 14, 2024

(54) MANUFACTURING METHODS FOR MULTI-LOBED COOLING HOLES

(71) Applicant: Raytheon Technologies Corporation, Farmington, CT (US)

(72) Inventors: Gordon Miller Reed, Plantsville, CT (US); Paul R. Faughnan, Jr., East Hampton, CT (US); John Quitter, Farmington, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 17/849,976

(22) Filed: Jun. 27, 2022

(65) Prior Publication Data

US 2022/0349319 A1  Nov. 3, 2022

Related U.S. Application Data

(60) Division of application No. 15/424,363, filed on Feb. 3, 2017, now Pat. No. 11,371,386, which is a
(Continued)

(51) Int. Cl.
*F01D 25/12*  (2006.01)
*B23B 35/00*  (2006.01)
(Continued)

(52) U.S. Cl.
CPC .............. *F01D 25/12* (2013.01); *B23B 35/00* (2013.01); *B23K 26/0622* (2015.10);
(Continued)

(58) Field of Classification Search
CPC .............. B23K 26/389; B23K 26/0622; B23K 26/082; B23K 26/146; B23K 2101/001;
(Continued)

(56) References Cited

U.S. PATENT DOCUMENTS 4,197,443 A    4/1980  Sidenstick
4,529,358 A    7/1985  Papell
(Continued)

FOREIGN PATENT DOCUMENTS

EP      0365195 A2    4/1990
EP      0375175 A1    6/1990
(Continued)

OTHER PUBLICATIONS

K. Kusterer, et al., "The Nekomimi Cooling Technology: Cooling Holes with Ears for High-Efficient Film Cooling," from Proceedings of ASME Turbo Expo, Jun. 6-10, 2011, pp. 1-11.
(Continued)

*Primary Examiner* — Jimmy Chou
(74) *Attorney, Agent, or Firm* — Kinney & Lange, P.A.

(57) ABSTRACT

A method for producing a diffusion cooling hole extending between a wall having a first wall surface and a second wall surface includes forming a cooling hole inlet at the first wall surface, forming a cooling hole outlet at the second wall surface, forming a metering section downstream from the inlet and forming a multi-lobed diffusing section between the metering section and the outlet. The inlet, outlet, metering section and multi-lobed diffusing section are formed by laser drilling, particle beam machining, fluid jet guided laser machining, mechanical machining, masking and combinations thereof.

18 Claims, 32 Drawing Sheets

Related U.S. Application Data continuation of application No. 13/544,140, filed on Jul. 9, 2012, now Pat. No. 9,598,979.

(60) Provisional application No. 61/599,379, filed on Feb. 15, 2012, provisional application No. 61/599,381, filed on Feb. 15, 2012, provisional application No. 61/599,372, filed on Feb. 15, 2012, provisional application No. 61/599,366, filed on Feb. 15, 2012, provisional application No. 61/599,386, filed on Feb. 15, 2012.

(51) Int. Cl.
| | |
|---|---|
| *B23K 26/0622* | (2014.01) |
| *B23K 26/082* | (2014.01) |
| *B23K 26/146* | (2014.01) |
| *B23K 26/382* | (2014.01) |
| *B23P 15/04* | (2006.01) |
| *B26F 3/00* | (2006.01) |
| *F23R 3/00* | (2006.01) |
| B23C 3/00 | (2006.01) |
| B23K 101/00 | (2006.01) |
| F01D 5/18 | (2006.01) |
| F01D 9/06 | (2006.01) |

(52) U.S. Cl.
CPC .......... *B23K 26/082* (2015.10); *B23K 26/146* (2015.10); *B23K 26/389* (2015.10); *B23P 15/04* (2013.01); *B26F 3/004* (2013.01); *F23R 3/002* (2013.01); *B23C 3/00* (2013.01); *B23K 2101/001* (2018.08); *B23P 2700/06* (2013.01); *F01D 5/186* (2013.01); *F01D 9/065* (2013.01); *F05D 2240/81* (2013.01); *F05D 2260/202* (2013.01); *F23R 2900/00019* (2013.01); *F23R 2900/03042* (2013.01); *Y02T 50/60* (2013.01)

(58) Field of Classification Search
CPC .......... F01D 25/12; F01D 5/186; F01D 9/065; F23R 2900/00019; F23R 3/002; F23R 2900/03042; B23B 35/00; B23P 15/04; B23P 2700/06; B26F 3/004; B23C 3/00; F05D 2240/81; F05D 2260/202; Y02T 50/60
See application file for complete search history.

(56) References Cited

U.S. PATENT DOCUMENTS

| | | | |
|---|---|---|---|
| 4,622,821 A | 11/1986 | Madden | |
| 4,653,279 A | 3/1987 | Reynolds | |
| 4,653,983 A | 3/1987 | Vehr | |
| 4,672,727 A | 6/1987 | Field | |
| 4,684,323 A * | 8/1987 | Field | F01D 5/186 |
| | | | 415/115 |
| 4,700,544 A | 10/1987 | Fucci | |
| 4,738,588 A | 4/1988 | Field | |
| 5,062,768 A | 11/1991 | Marriage | |
| 5,096,379 A | 3/1992 | Stroud et al. | |
| 5,129,231 A | 7/1992 | Becker et al. | |
| 5,252,026 A | 10/1993 | Shepherd | |
| 5,326,224 A | 7/1994 | Lee et al. | |
| 5,358,374 A | 10/1994 | Correia et al. | |
| 5,382,133 A * | 1/1995 | Moore | F01D 5/186 |
| | | | 415/115 |
| 5,418,345 A | 5/1995 | Adamski | |
| 5,419,681 A | 5/1995 | Lee | |
| 5,609,779 A | 3/1997 | Crow et al. | |
| 5,651,662 A | 7/1997 | Lee et al. | |
| 5,660,525 A | 8/1997 | Lee et al. | |
| 5,683,600 A | 11/1997 | Kelley et al. | |
| 5,813,836 A | 9/1998 | Starkweather | |
| 6,139,258 A | 10/2000 | Lang, III et al. | |
| 6,172,331 B1 | 1/2001 | Chen | |
| 6,183,199 B1 * | 2/2001 | Beeck | F01D 5/186 |
| | | | 416/97 R |
| 6,241,468 B1 | 6/2001 | Lock et al. | |
| 6,243,948 B1 * | 6/2001 | Lee | F01D 5/005 |
| | | | 29/402.06 |
| 6,285,002 B1 | 9/2001 | Ngoi et al. | |
| 6,287,075 B1 * | 9/2001 | Kercher | F01D 5/186 |
| | | | 415/115 |
| 6,307,175 B1 | 10/2001 | Blochlinger et al. | |
| 6,431,830 B1 | 8/2002 | Richter et al. | |
| 6,494,678 B1 | 12/2002 | Bunker | |
| 6,547,524 B2 | 4/2003 | Kohli et al. | |
| 6,572,335 B2 | 6/2003 | Kuwabara et al. | |
| 6,744,010 B1 | 6/2004 | Pepe et al. | |
| 6,847,004 B2 | 1/2005 | Das et al. | |
| 6,944,580 B1 | 9/2005 | Blume et al. | |
| 6,973,419 B1 | 12/2005 | Fortin et al. | |
| 6,979,176 B2 | 12/2005 | Nakamata et al. | |
| 7,186,085 B2 | 3/2007 | Lee | |
| 7,273,351 B2 | 9/2007 | Kopmels | |
| 7,325,580 B2 | 2/2008 | Lee et al. | |
| 7,374,401 B2 | 5/2008 | Lee | |
| 7,578,653 B2 | 8/2009 | Klasing et al. | |
| 7,726,131 B2 | 6/2010 | Sze et al. | |
| 7,766,609 B1 | 8/2010 | Liang | |
| 7,887,294 B1 | 2/2011 | Liang | |
| 7,997,868 B1 * | 8/2011 | Liang | F01D 5/186 |
| | | | 416/97 R |
| 8,038,399 B1 | 10/2011 | Liang | |
| 8,057,181 B1 * | 11/2011 | Liang | F01D 5/186 |
| | | | 416/97 R |
| 8,066,484 B1 * | 11/2011 | Liang | F01D 5/186 |
| | | | 415/115 |
| 8,522,558 B1 | 9/2013 | Xu | |
| 8,572,983 B2 | 11/2013 | Xu | |
| 8,584,470 B2 | 11/2013 | Zelesky et al. | |
| 8,683,813 B2 | 4/2014 | Xu et al. | |
| 8,683,814 B2 | 4/2014 | Xu | |
| 8,689,568 B2 | 4/2014 | Kohli et al. | |
| 8,707,713 B2 | 4/2014 | Levasseur et al. | |
| 8,733,111 B2 | 5/2014 | Gleiner et al. | |
| 8,763,402 B2 | 7/2014 | Xu et al. | |
| 8,850,828 B2 | 10/2014 | Mongillo, Jr. et al. | |
| 9,024,226 B2 | 5/2015 | Levasseur et al. | |
| 9,273,560 B2 | 3/2016 | Gleiner et al. | |
| 9,279,330 B2 | 3/2016 | Xu et al. | |
| 9,284,844 B2 | 3/2016 | Xu | |
| 9,410,435 B2 | 8/2016 | Xu | |
| 9,416,665 B2 | 8/2016 | Xu et al. | |
| 9,416,971 B2 | 8/2016 | Xu | |
| 9,422,815 B2 | 8/2016 | Xu | |
| 2001/0036401 A1 | 11/2001 | Harvey et al. | |
| 2002/0159888 A1 | 10/2002 | Rinck et al. | |
| 2005/0106020 A1 | 5/2005 | Bunker et al. | |
| 2005/0135931 A1 | 6/2005 | Nakamata et al. | |
| 2007/0062915 A1 | 3/2007 | Chang et al. | |
| 2007/0119832 A1 | 5/2007 | Beck et al. | |
| 2008/0003096 A1 | 1/2008 | Kohli et al. | |
| 2008/0085395 A1 | 4/2008 | Fernihough et al. | |
| 2008/0145208 A1 | 6/2008 | Klasing et al. | |
| 2008/0197120 A1 | 8/2008 | Beck et al. | |
| 2009/0013695 A1 | 1/2009 | Dierberger et al. | |
| 2009/0142548 A1 | 6/2009 | Patterson et al. | |
| 2009/0169394 A1 | 7/2009 | Crow et al. | |
| 2009/0270014 A1 * | 10/2009 | Miller | B08B 3/024 |
| | | | 451/39 |
| 2009/0304499 A1 * | 12/2009 | Strock | F23R 3/002 |
| | | | 415/175 |
| 2010/0068032 A1 | 3/2010 | Liang | |
| 2010/0068068 A1 | 3/2010 | Liang | |
| 2010/0282721 A1 | 11/2010 | Bunker et al. | |
| 2010/0329846 A1 | 12/2010 | Ramachandran et al. | |
| 2011/0097191 A1 | 4/2011 | Bunker | |
| 2011/0123312 A1 | 5/2011 | Venkataramanan et al. | |
| 2011/0185572 A1 | 8/2011 | Wei et al. | |

(56) References Cited

U.S. PATENT DOCUMENTS

| | | |
|---|---|---|
| 2011/0293423 A1* | 12/2011 | Bunker ............... F01D 5/186 29/889 |
| 2012/0051941 A1 | 3/2012 | Bunker |
| 2012/0167389 A1 | 7/2012 | Lacy et al. |
| 2013/0206739 A1 | 8/2013 | Reed et al. |
| 2013/0209235 A1 | 8/2013 | Xu |

FOREIGN PATENT DOCUMENTS

| | | |
|---|---|---|
| EP | 0807485 A2 | 11/1997 |
| EP | 1326007 A2 | 7/2003 |
| EP | 1609949 A1 | 12/2005 |
| EP | 1691033 A1 | 8/2006 |
| EP | 1873353 A2 | 1/2008 |
| EP | 2390465 A2 | 11/2011 |
| EP | 2592229 A2 | 5/2013 |

OTHER PUBLICATIONS

International Search Report and Written Opinion from PCT Application Serial No. PCT/US2013/025689, dated Nov. 21, 2013, 13 pages.
Extended European Search Report for EP Application No. 13785196.0, dated Jan. 29, 2016, 10 pages.

* cited by examiner

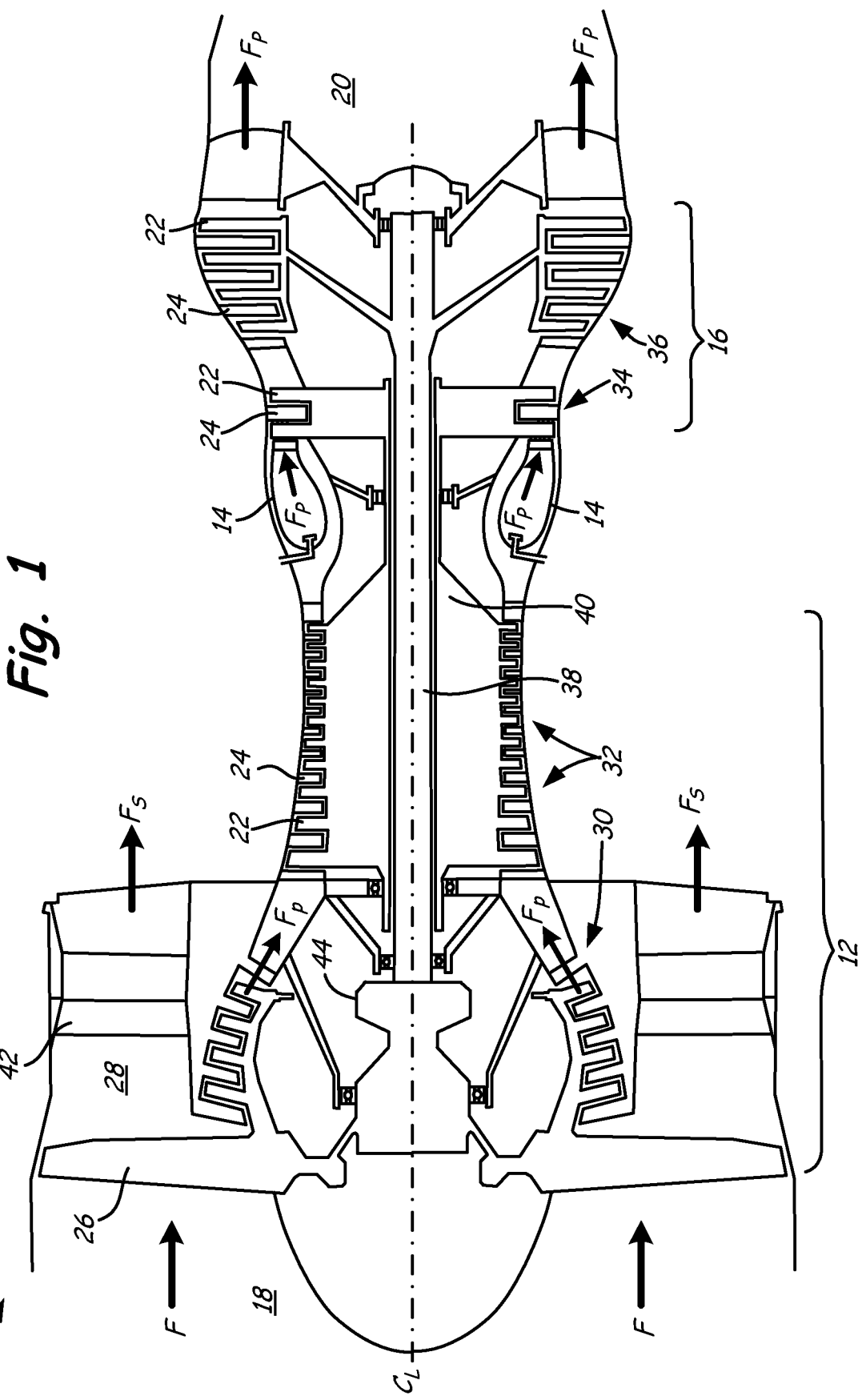

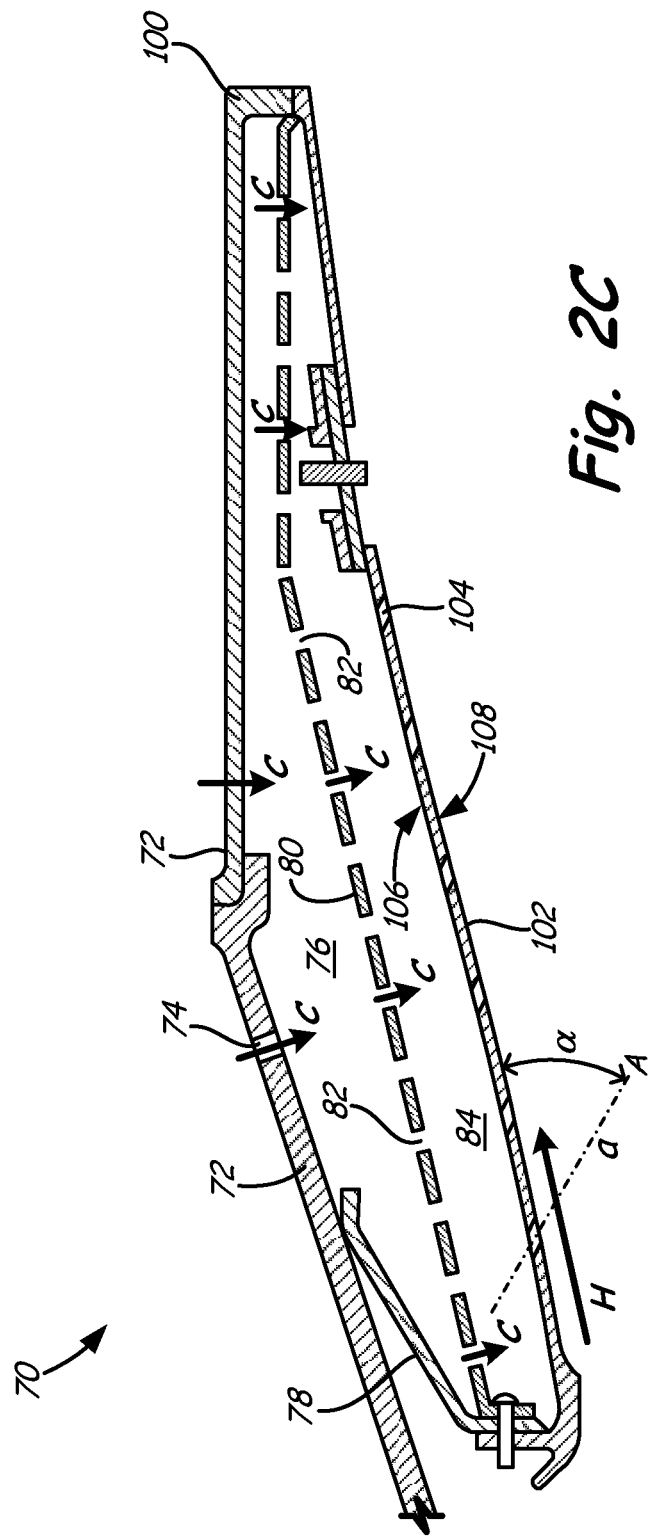

MANUFACTURING METHODS FOR MULTI-LOBED COOLING HOLES

CROSS-REFERENCE TO RELATED APPLICATIONS

This application is a division of U.S. patent application Ser. No. 15/424,363 filed Feb. 3, 2017, entitled MANUFACTURING METHODS FOR MULTI-LOBED COOLING HOLES, which is a continuation of U.S. patent application Ser. No. 13/544,140 filed Jul. 9, 2012, entitled MANUFACTURING METHODS FOR MULTI-LOBED COOLING HOLES, which claims priority to U.S. Provisional Patent Application Ser. No. 61/599,366 filed Feb. 15, 2012, entitled EDM METHOD FOR MULTI-LOBED COOLING HOLE; U.S. Provisional Patent Application Ser. No. 61/599,372 filed Feb. 15, 2012, entitled MULTI-LOBED COOLING HOLE AND METHOD OF MANUFACTURE; U.S. Provisional Patent Application Ser. No. 61/599,379 filed Feb. 15, 2012, entitled MULTI-LOBED COOLING HOLE AND METHOD OF MANUFACTURE; U.S. Provisional Patent Application Ser. No. 61/599,381 filed Feb. 15, 2012, entitled TRI-LOBED COOLING HOLE AND METHOD OF MANUFACTURE; and U.S. Provisional Patent Application Ser. No. 61/599,386 filed Feb. 15, 2012, entitled METHODS FOR PRODUCING MULTI-LOBED COOLING HOLES, each of which is incorporated by reference herein, in its entirety.

BACKGROUND

This invention relates generally to turbomachinery, and specifically to turbine flow path components for gas turbine engines. In particular, the invention relates to cooling techniques for airfoils and other gas turbine engine components exposed to hot working fluid flow, including, but not limited to, rotor blades and stator vane airfoils, endwall surfaces including platforms, shrouds and compressor and turbine casings, combustor liners, turbine exhaust assemblies, thrust augmentors and exhaust nozzles.

Gas turbine engines are rotary-type combustion turbine engines built around a power core made up of a compressor, combustor and turbine, arranged in flow series with an upstream inlet and downstream exhaust. The compressor section compresses air from the inlet, which is mixed with fuel in the combustor and ignited to generate hot combustion gas. The turbine section extracts energy from the expanding combustion gas, and drives the compressor section via a common shaft. Expanded combustion products are exhausted downstream, and energy is delivered in the form of rotational energy in the shaft, reactive thrust from the exhaust, or both.

Gas turbine engines provide efficient, reliable power for a wide range of applications in aviation, transportation and industrial power generation. Small-scale gas turbine engines typically utilize a one-spool design, with co-rotating compressor and turbine sections. Larger-scale combustion turbines including jet engines and industrial gas turbines (IGTs) are generally arranged into a number of coaxially nested spools. The spools operate at different pressures, temperatures and spool speeds, and may rotate in different directions.

Individual compressor and turbine sections in each spool may also be subdivided into a number of stages, formed of alternating rows of rotor blade and stator vane airfoils. The airfoils are shaped to turn, accelerate and compress the working fluid flow, or to generate lift for conversion to rotational energy in the turbine.

Industrial gas turbines often utilize complex nested spool configurations, and deliver power via an output shaft coupled to an electrical generator or other load, typically using an external gearbox. In combined cycle gas turbines (CCGTs), a steam turbine or other secondary system is used to extract additional energy from the exhaust, improving thermodynamic efficiency. Gas turbine engines are also used in marine and land-based applications, including naval vessels, trains and armored vehicles, and in smaller-scale applications such as auxiliary power units.

Aviation applications include turbojet, turbofan, turboprop and turboshaft engine designs. In turbojet engines, thrust is generated primarily from the exhaust. Modern fixed-wing aircraft generally employ turbofan and turboprop configurations, in which the low pressure spool is coupled to a propulsion fan or propeller. Turboshaft engines are employed on rotary-wing aircraft, including helicopters, typically using a reduction gearbox to control blade speed. Unducted (open rotor) turbofans and ducted propeller engines also known, in a variety of single-rotor and contra-rotating designs with both forward and aft mounting configurations.

Aviation turbines generally utilize two and three-spool configurations, with a corresponding number of coaxially rotating turbine and compressor sections. In two-spool designs, the high pressure turbine drives a high pressure compressor, forming the high pressure spool or high spool. The low-pressure turbine drives the low spool and fan section, or a shaft for a rotor or propeller. In three-spool engines, there is also an intermediate pressure spool. Aviation turbines are also used to power auxiliary devices including electrical generators, hydraulic pumps and elements of the environmental control system, for example using bleed air from the compressor or via an accessory gearbox.

Additional turbine engine applications and turbine engine types include intercooled, regenerated or recuperated and variable cycle gas turbine engines, and combinations thereof. In particular, these applications include intercooled turbine engines, for example with a relatively higher pressure ratio, regenerated or recuperated gas turbine engines, for example with a relatively lower pressure ratio or for smaller-scale applications, and variable cycle gas turbine engines, for example for operation under a range of flight conditions including subsonic, transonic and supersonic speeds. Combined intercooled and regenerated/recuperated engines are also known, in a variety of spool configurations with traditional and variable cycle modes of operation.

Turbofan engines are commonly divided into high and low bypass configurations. High bypass turbofans generate thrust primarily from the fan, which accelerates airflow through a bypass duct oriented around the engine core. This design is common on commercial aircraft and transports, where noise and fuel efficiency are primary concerns. The fan rotor may also operate as a first stage compressor, or as a pre-compressor stage for the low-pressure compressor or booster module. Variable-area nozzle surfaces can also be deployed to regulate the bypass pressure and improve fan performance, for example during takeoff and landing. Advanced turbofan engines may also utilize a geared fan drive mechanism to provide greater speed control, reducing noise and increasing engine efficiency, or to increase or decrease specific thrust.

Low bypass turbofans produce proportionally more thrust from the exhaust flow, generating greater specific thrust for use in high-performance applications including supersonic jet aircraft. Low bypass turbofan engines may also include variable-area exhaust nozzles and afterburner or augmentor assemblies for flow regulation and short-term thrust enhancement. Specialized high-speed applications include continuously afterburning engines and hybrid turbojet/ramjet configurations.

Across these applications, turbine performance depends on the balance between higher pressure ratios and core gas path temperatures, which tend to increase efficiency, and the related effects on service life and reliability due to increased stress and wear. This balance is particularly relevant to gas turbine engine components in the hot sections of the compressor, combustor, turbine and exhaust sections, where active cooling is required to prevent damage due to high gas path temperatures and pressures.

SUMMARY

This invention is directed to methods of manufacture, for example methods for manufacturing cooling holes in gas turbine engine components. The methods include two-step laser machining, fluid-jet guided laser machining, and electron beam machining, mechanical machining, masking and combinations thereof.

A method for producing a diffusion cooling hole extending between a wall having a first wall surface and a second wall surface includes forming a cooling hole inlet at the first wall surface, forming a cooling hole outlet at the second wall surface, forming a metering section downstream from the inlet and forming a multi-lobed diffusing section between the metering section and the outlet. The inlet, outlet, metering section and multi-lobed diffusing section are formed by laser drilling, particle beam machining, fluid jet guided laser machining, mechanical machining, masking and combinations thereof.

A method for producing a diffusion cooling hole extending between a wall having a first wall surface and a second wall surface includes forming a cooling hole inlet at the first wall surface, forming a cooling hole outlet at the second wall surface, forming a metering section downstream from the inlet and forming a multi-lobed diffusing section between the metering section and the outlet. The inlet and metering section are formed by a first technique selected from the group consisting of laser drilling, particle beam machining, fluid jet guided laser machining, mechanical machining and masking. The outlet and multi-lobed diffusing section are formed by a second technique different from the first technique and selected from the group consisting of laser drilling, particle beam drilling, fluid jet guided laser machining, mechanical machining and masking.

A method for repairing a component having a wall with multi-lobed diffusion cooling holes includes applying a new coating to the wall, locating the diffusion cooling hole to be repaired, forming a multi-lobed diffusing section and an outlet in the new coating to correspond with a metering section located in the wall. The multi-lobed diffusing section and the outlet are formed by a technique selected from the group consisting of laser drilling, particle beam machining, fluid jet guided laser machining, mechanical machining, masking and combinations thereof.

BRIEF DESCRIPTION OF THE DRAWINGS

FIG. 1 is a cross-sectional view of a gas turbine engine.
FIG. 2C is a cross-sectional view of an impingement and film cooling assembly for a gas turbine engine.

DETAILED DESCRIPTION

Figure 2A:
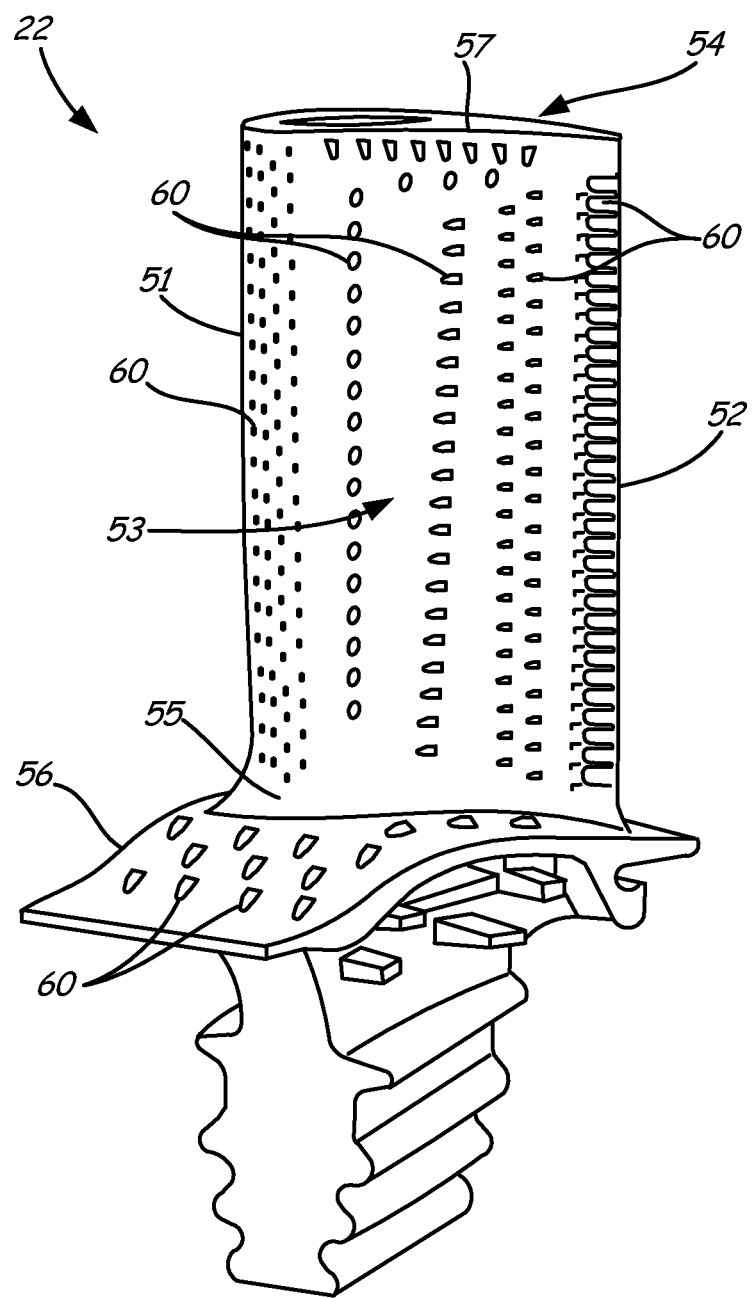
FIG. 2A is a perspective view of an airfoil for a gas turbine engine, in a rotor blade configuration.

FIG. 1 is a cross-sectional view of gas turbine engine 10. Gas turbine engine (or turbine engine) 10 includes a power core with compressor section 12, combustor 14 and turbine section 16 arranged in flow series between upstream inlet 18 and downstream exhaust 20. Compressor section 12 and turbine section 16 are arranged into a number of alternating stages of rotor airfoils (or blades) 22 and stator airfoils (or vanes) 24.

In the turbofan configuration of FIG. 1, propulsion fan 26 is positioned in bypass duct 28, which is coaxially oriented about the engine core along centerline (or turbine axis) $C_L$. An open-rotor propulsion stage 26 may also provided, with turbine engine 10 operating as a turboprop or unducted turbofan engine. Alternatively, fan rotor 26 and bypass duct 28 may be absent, with turbine engine 10 configured as a turbojet or turboshaft engine, or an industrial gas turbine.

For improved service life and reliability, components of gas turbine engine 10 are provided with an improved cooling configuration, as described below. Suitable components for the cooling configuration include rotor airfoils 22, stator airfoils 24 and other gas turbine engine components exposed to hot gas flow, including, but not limited to, platforms, shrouds, casings and other endwall surfaces in hot sections of compressor 12 and turbine 16, and liners, nozzles, afterburners, augmentors and other gas wall components in combustor 14 and exhaust section 20.

In the two-spool, high bypass configuration of FIG. 1, compressor section 12 includes low pressure compressor (LPC) 30 and high pressure compressor (HPC) 32, and turbine section 16 includes high pressure turbine (HPT) 34 and low pressure turbine (LPT) 36. Low pressure compressor 30 is rotationally coupled to low pressure turbine 36 via low pressure (LP) shaft 38, forming the LP spool or low spool. High pressure compressor 32 is rotationally coupled to high pressure turbine 34 via high pressure (HP) shaft 40, forming the HP spool or high spool.

Flow F at inlet 18 divides into primary (core) flow $F_P$ and secondary (bypass) flow $F_S$ downstream of fan rotor 26. Fan rotor 26 accelerates secondary flow $F_S$ through bypass duct 28, with fan exit guide vanes (FEGVs) 42 to reduce swirl and improve thrust performance. In some designs, structural guide vanes (SGVs) 42 are used, providing combined flow turning and load bearing capabilities.

Primary flow $F_P$ is compressed in low pressure compressor 30 and high pressure compressor 32, then mixed with fuel in combustor 14 and ignited to generate hot combustion gas. The combustion gas expands to provide rotational energy in high pressure turbine 34 and low pressure turbine 36, driving high pressure compressor 32 and low pressure compressor 30, respectively. Expanded combustion gases exit through exhaust section (or exhaust nozzle) 20, which can be shaped or actuated to regulate the exhaust flow and improve thrust performance.

Low pressure shaft 38 and high pressure shaft 40 are mounted coaxially about centerline $C_L$, and rotate at different speeds. Fan rotor (or other propulsion stage) 26 is rotationally coupled to low pressure shaft 38. In advanced designs, fan drive gear system 44 is provided for additional fan speed control, improving thrust performance and efficiency with reduced noise output.

Fan rotor 26 may also function as a first-stage compressor for gas turbine engine 10, and LPC 30 may be configured as an intermediate compressor or booster. Alternatively, propulsion stage 26 has an open rotor design, or is absent, as described above. Gas turbine engine 10 thus encompasses a wide range of different shaft, spool and turbine engine configurations, including one, two and three-spool turboprop and (high or low bypass) turbofan engines, turboshaft engines, turbojet engines, and multi-spool industrial gas turbines.

In each of these applications, turbine efficiency and performance depend on the overall pressure ratio, defined by the total pressure at inlet 18 as compared to the exit pressure of compressor section 12, for example at the outlet of high pressure compressor 32, entering combustor 14. Higher pressure ratios, however, also result in greater gas path temperatures, increasing the cooling loads on rotor airfoils 22, stator airfoils 24 and other components of gas turbine engine 10. To reduce operating temperatures, increase service life and maintain engine efficiency, these components are provided with improved cooling configurations, as described below. Suitable components include, but are not limited to, cooled gas turbine engine components in compressor sections 30 and 32, combustor 14, turbine sections 34 and 36, and exhaust section 20 of gas turbine engine 10.

FIG. 2A is a perspective view of rotor airfoil (or blade) 22 for gas turbine engine 10, as shown in FIG. 1, or for another turbomachine. Rotor airfoil 22 extends axially from leading edge 51 to trailing edge 52, defining pressure surface 53 (front) and suction surface 54 (back) therebetween.

Pressure and suction surfaces 53 and 54 form the major opposing surfaces or walls of airfoil 22, extending axially between leading edge 51 and trailing edge 52, and radially from root section 55, adjacent inner diameter (ID) platform 56, to tip section 57, opposite ID platform 56. In some designs, tip section 57 is shrouded.

Cooling holes or outlets 60 are provided on one or more surfaces of airfoil 22, for example along leading edge 51, trailing edge 52, pressure (or concave) surface 53, or suction (or convex) surface 54, or a combination thereof. Cooling holes or passages 60 may also be provided on the endwall surfaces of airfoil 22, for example along ID platform 56, or on a shroud or engine casing adjacent tip section 57.

Figure 2B:
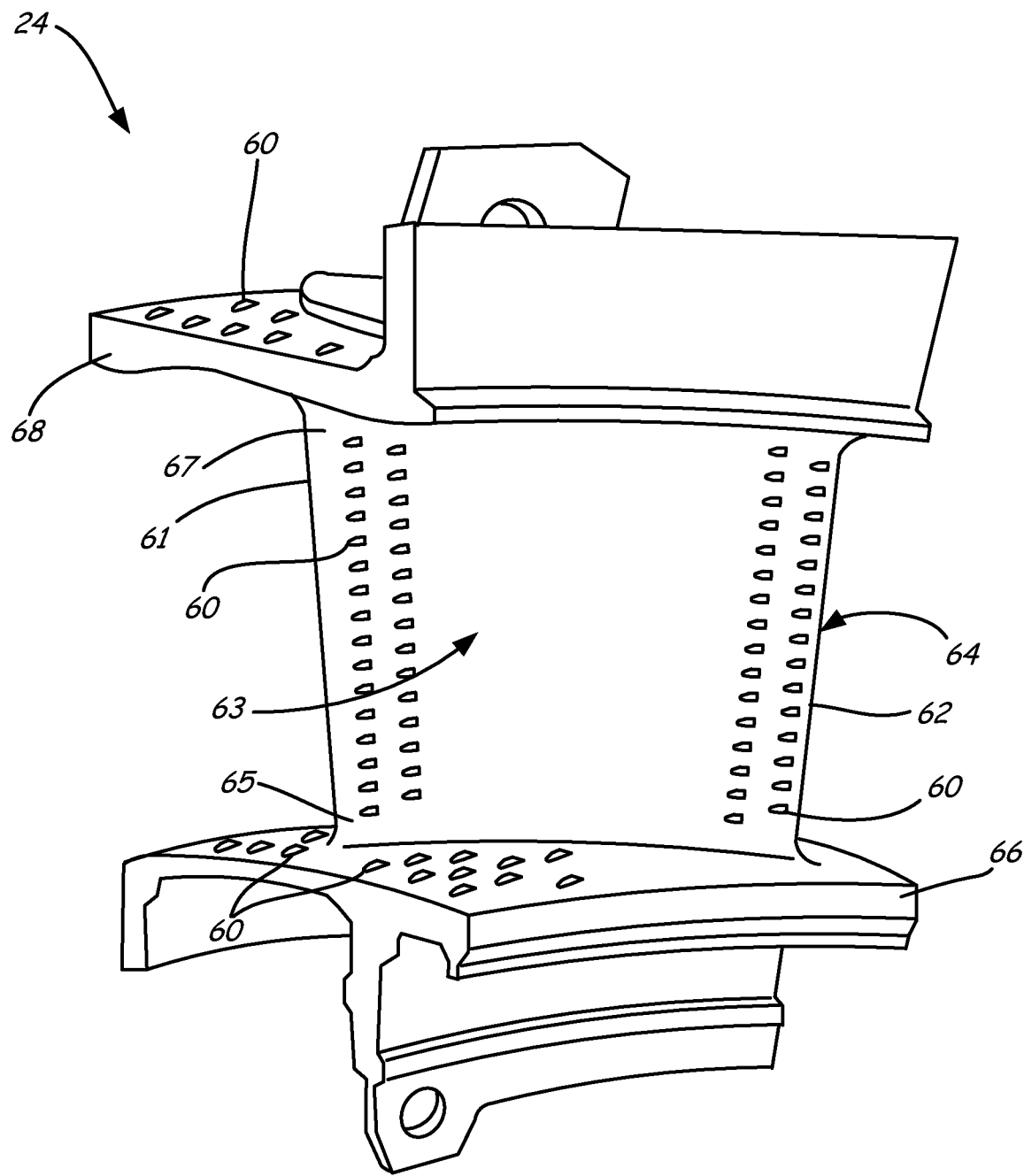
FIG. 2B is a perspective view of an airfoil for a gas turbine engine, in a stator vane configuration.

FIG. 2B is a perspective view of stator airfoil (or vane) 24 for gas turbine engine 10, as shown in FIG. 1, or for another turbomachine. Stator airfoil 24 extends axially from leading edge 61 to trailing edge 62, defining pressure surface 63 (front) and suction surface 64 (back) therebetween. Pressure and suction surfaces 63 and 64 extend from inner (or root) section 65, adjacent ID platform 66, to outer (or tip) section 67, adjacent outer diameter (OD) platform 68.

Cooling holes or outlets 60 are provided along one or more surfaces of airfoil 24, for example leading or trailing edge 61 or 62, pressure (concave) or suction (convex) surface 63 or 64, or a combination thereof. Cooling holes or passages 60 may also be provided on the endwall surfaces of airfoil 24, for example along ID platform 66 and OD platform 68.

Rotor airfoils 22 (FIG. 2A) and stator airfoils 24 (FIG. 2B) are formed of high strength, heat resistant materials such as high temperature alloys and superalloys, and are provided with thermal and erosion-resistant coatings. Airfoils 22 and 24 are also provided with internal cooling passages and cooling holes 60 to reduce thermal fatigue and wear, and to prevent melting when exposed to hot gas flow in the higher temperature regions of a gas turbine engine or other turbomachine. Cooling holes 60 deliver cooling fluid (e.g., steam or air from a compressor) through the outer walls and platform structures of airfoils 22 and 24, creating a thin layer (or film) of cooling fluid to protect the outer (gas path) surfaces from high temperature flow.

While surface cooling extends service life and increases reliability, injecting cooling fluid into the gas path also reduces engine efficiency, and the cost in efficiency increases with the required cooling flow. Cooling holes 60 are thus provided with improved metering and inlet geometry to reduce jets and blow off, and improved diffusion and exit geometry to reduce flow separation and corner effects. Cooling holes 60 reduce flow requirements and improve the spread of cooling fluid across the hot outer surfaces of airfoils 22 and 24, and other gas turbine engine components, so that less flow is needed for cooling and efficiency is maintained or increased.

Multi-lobed cooling holes have been found to offer improved cooling effectiveness for some gas turbine engine components. Multi-lobed cooling holes can improve the film of cooling air formed on the outer surface of a component by minimizing flow separation, preventing "blow off" and by laterally spreading the cooling film to increase coverage. One embodiment of a multi-lobed cooling hole is described below.

FIG. 2C is a cross-sectional view of impingement and film cooling (float wall) assembly 70. Assembly 70 includes outer case 72 with cooling fluid apertures 74 for directing cooling fluid flow C into cooling fluid plenum 76, with seal 78 and float wall (splash plate or impingement baffle) 80 having impingement apertures 82 for impingement cooling of turbine component 100 along gas flow path wall 102.

As shown in FIG. 2C, gas path wall (or liner wall) 102 extends along impingement baffle 80, across impingement plenum 84. First (outer) major surface 106 of gas path wall 102 is exposed to impingement flow of cooling fluid C from cooling fluid plenum 76, through impingement apertures (or holes) 82 in impingement baffle 80. Second (inner) major surface 108 extends opposite first major surface 106, and is exposed to hot gas flow H, for example combustion gas or exhaust gas. Cooling channels 104 extend from impingement plenum 84 at first surface 106 through gas path wall 102 to second surface 108.

Cooling fluid C is supplied to cooling plenum 76 via cooling holes 74 in an outer turbine case or other plenum boundary 72. Cooling fluid C from cooling plenum 76 is supplied to impingement plenum 84 via impingement apertures 82 in float wall (or impingement baffle) 80, where impingement apertures 82 are sized to produce jets of cooling fluid flow C impinging onto first surface 106 of gas path wall 102.

Typically, impingement apertures 82 are pointed at first surface 106 of gas path wall 102 between cooling passages 104. Depending on application, the spacing between baffle wall (impingement plenum) 84 and flow path wall (or gas path wall) may be about three times the inlet diameter of cooling passages 104.

Cooling passages 104 extend through gas path wall 102 from first (relatively cool) surface 106 to second (relatively hot) surface 108. Axis A is inclined in a downstream sense at angle α with respect to the direction of hot gas flow H, in order to encourage attached flow along hot inner surface 108 of gas path wall 102. In some embodiments, cooling passages 104 also have a circumferential component, in order to encourage tangential film flow.

The example of FIG. 2C is merely representative, and varies from application to application. For example, cooling assembly 70 may be configured for use with a turbine exhaust assembly or similar gas turbine engine component 100 in low pressure turbine 36 or exhaust section 20 of gas turbine engine 10, as shown in FIG. 1, or with a combustor liner assembly or similar gas turbine engine component 100 for combustor 14. Alternatively, cooling assembly 70 may be configured for use with a cooled turbine liner or casing component 100 in high pressure turbine 34 or low pressure turbine 36, a hot section compressor liner or casing component 100 for high pressure compressor 32, or an exhaust nozzle liner or augmentor component 100 for exhaust section 20.

In airfoil applications, cooling assembly 70 is configured for use with rotor airfoil 22, stator airfoil 24 or other airfoil component 100, with cooling passage 104 forming cooling hole 60 in a pressure surface, suction surface or platform surface, as shown in FIGS. 2A and 2B. Impingement baffle 80 extends within airfoil component 100, adjacent first surface 106 of flow path wall 102, where first surface 106 is an inner surface of the airfoil, and second (outer) surface 108 is exposed to hot working fluid flow.

The components of cooling assembly 70 are typically manufactured from durable heat-resistant materials such as high-temperature metal alloys or superalloys, in order to protect from hot gas (or working fluid) flow H. In addition, thermal barrier coatings and other protective coatings may be used, as described above for airfoils 22 and 24. To further improve service life and reliability, cooling passages (or cooling holes) 104 are configured with improved metering and diffusive flow geometries, as described below.

Figure 3:
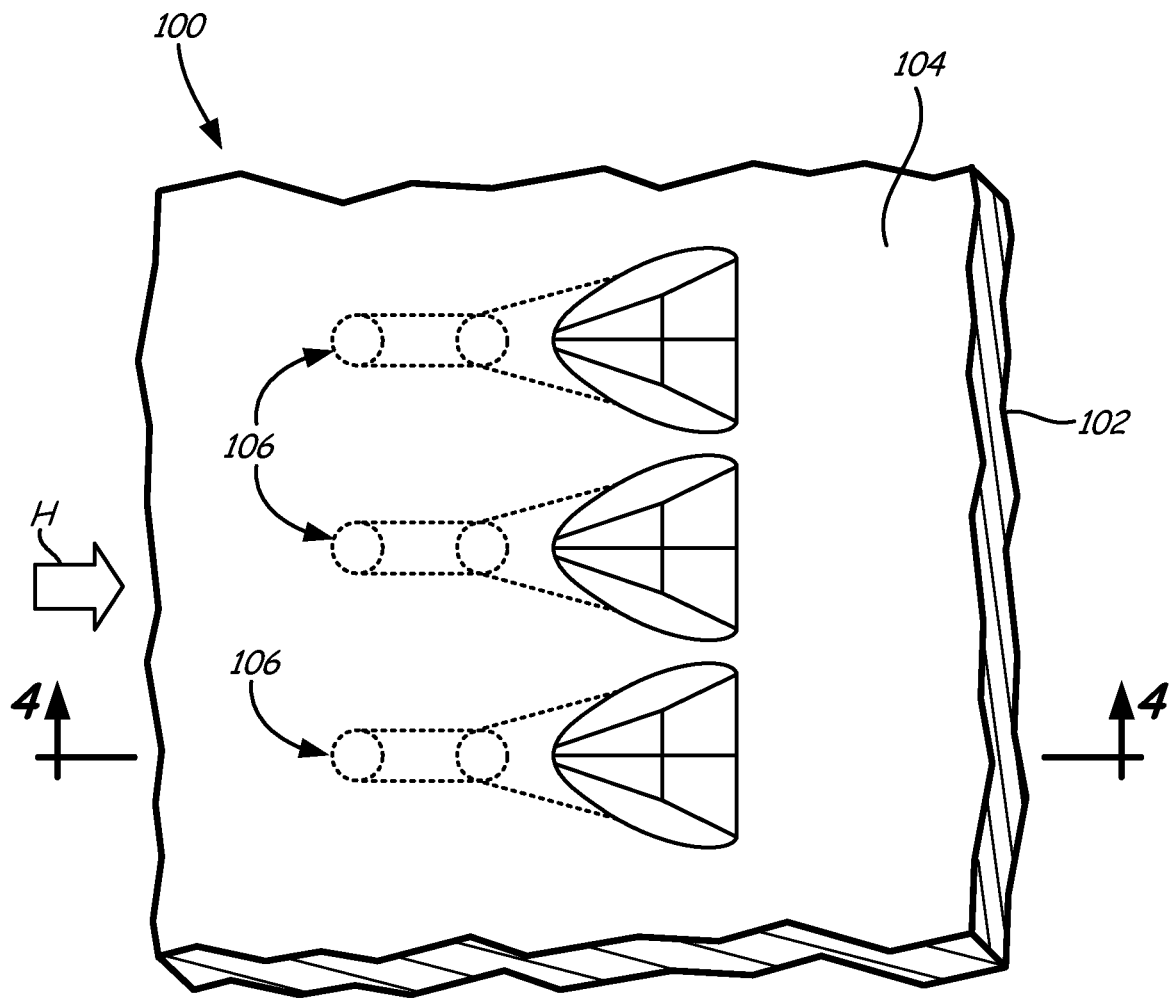
FIG. 3 is a schematic view of a gas flow path wall with multi-lobed cooling holes.

FIG. 3 is a perspective view of gas flow path wall 100 with multi-lobed film cooling holes 106. Wall 100 includes first wall surface 102 and second wall surface 104. Typically, wall 100 is metallic and second wall surface 104 can include a thermal barrier coating.

Multi-lobed film cooling holes 106 are oriented so that their outlets are positioned on second wall surface 104. During gas turbine engine operation, second wall surface 104 is in proximity to high temperature gases (e.g., combustion gases, air). Cooling air is delivered inside wall 100 where it exits the interior of the component through cooling holes 106 and forms a cooling film on second wall surface 104. In this particular example, cooling holes 106 have two lobes in the diffusing section, proximate the cooling hole outlet on second wall surface 104.

Cooling air flows out of cooling holes 106, with cooling air flowing through each of the lobes in the diffusing section. Cooling holes 106 can be arranged in a row on wall 100 and positioned axially so that cooling air flows in substantially the same direction longitudinally as hot gas flowing past wall 100. That is, cooling air exits cooling holes 106 in substantially the same direction as the hot gas flowing along second wall surface 104 (represented by arrow H).

In this particular example, a row of cooling holes 106 is oriented substantially perpendicular to the direction of flow H. In other examples, the orientation of cooling holes 106 can be arranged on second wall surface 104 so that the flow of cooling air is perpendicular to the hot gas flow and second surface 104 (e.g., cooling air exits cooling holes 106 radially) or at an angle between parallel and perpendicular. Cooling holes 106 can also be provided in a staggered formation on wall 100.

Cooling holes 106 can be located on a variety of components that require cooling. Suitable components include, but are not limited to, turbine and compressor vanes and blades, combustors, liners, blade outer air seals and augmentors. Cooling holes 106 can also be located on the pressure side or suction side of vanes and blades, blade tips and blade or vane platform surfaces.

Figure 4:
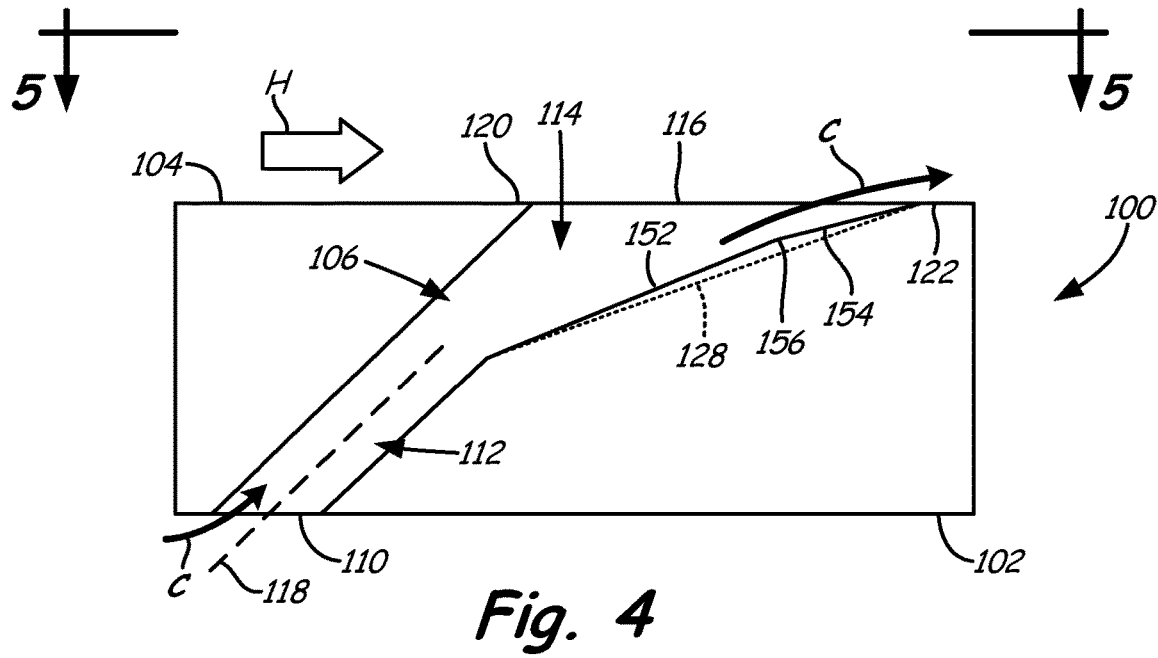
FIG. 4 is a sectional view of a multi-lobed cooling hole as shown in FIG. 3, taken along line 4-4.
Figure 5:
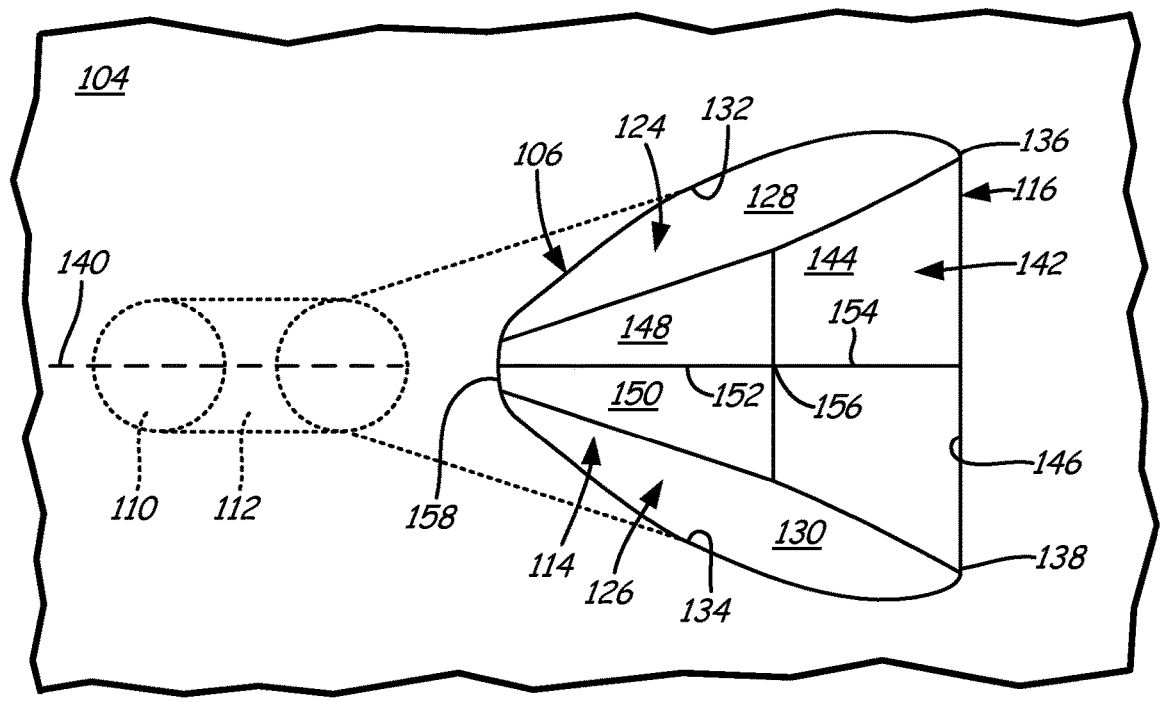
FIG. 5 is a view of a multi-lobed cooling hole as shown in FIG. 4, taken along line 5-5.

FIGS. 4 and 5 illustrate cooling holes 106 in greater detail. FIG. 4 is a sectional view of multi-lobed film cooling hole 106 of FIG. 3 taken along line 4-4. FIG. 5 illustrates a view of cooling hole 106 of FIG. 4 taken along line 5-5. Cooling hole 106 includes inlet 110, metering section 112, diffusing section 114 and outlet 116. Inlet 110 is an opening located on first wall surface 102. Cooling air C enters cooling hole 106 through inlet 110 and passes through metering section 112 and diffusing section 114 before exiting cooling hole 106 at outlet 116 along second wall surface 104.

Metering section 112 is adjacent to and downstream from inlet 110 and controls (meters) the flow of air through cooling hole 106. In some embodiments, metering section 112 has a substantially constant flow area from inlet 110 to diffusing section 114. Metering section 112 can have circular, oblong (oval or elliptical) or racetrack (oval with two parallel sides having straight portions) shaped axial cross sections. Metering section 112 can also have other cross-sectional geometries.

In the particular embodiments of FIGS. 4 and 5, metering section 112 has a circular cross section, for example with length l and diameter d. In exemplary embodiments, inlet 110 and metering section 112 have the same diameter d. In some embodiments, circular metering section 112 has a length l according to the relationship: $d \leq l \leq 3d$. That is, the length of metering section 112 is between one and three times its diameter. The length of metering section 112 can exceed 3d, reaching upwards of 30d.

In alternate embodiments, metering section 112 has an oblong or racetrack-shaped cross section. As oblong and racetrack configurations are not circular, their metering sections 112 have a length l and hydraulic diameter $d_h$.

Hydraulic diameters ($d_h$) are used to describe flow in non-circular channels. In some embodiments, metering section 112 has a length l according to the relationship: $d_h \leq l \leq 3d_h$. That is, the length of metering section 112 is between one and three times its hydraulic diameter. Again, the length of metering section 112 can exceed $3d_h$, reaching upwards of $30d_h$.

In exemplary embodiments, metering section 112 is inclined with respect to wall 100 as illustrated in FIG. 4 (e.g., metering section 112 is not perpendicular to wall 100). Metering section 112 has a longitudinal axis represented by numeral 118.

Diffusing section 114 is adjacent to and downstream from metering section 112. Cooling air C diffuses within diffusing section 114 before exiting cooling hole 106 along second wall surface 104. Second wall surface 104 includes upstream end 120 (upstream of cooling hole 106) and downstream end 122 (downstream from cooling hole 106). Diffusing section 114 opens along second wall surface 104 between upstream end 120 and downstream end 122. Cooling air C diffuses away from longitudinal axis 118 in diffusing section 114 as it flows towards outlet 116.

As shown in FIG. 5, diffusing section 114 includes two channel-like lobes 124 and 126. Lobes 124 and 126 are surfaces of wall 100 that define the void of cooling hole 106 at diffusing section 114. Each lobe 124, 126 diverges longitudinally and laterally from metering section 112 and has a bottom surface (bottom surfaces 128 and 130, respectively), a side wall along the outer edge of diffusing section 114 (side walls 132 and 134, respectively) and a trailing edge (trailing edges 136 and 138, respectively).

FIG. 4 illustrates the longitudinal divergence (from longitudinal axis 118), while FIG. 5 illustrates the lateral divergence (from centerline axis 140). First lobe 124 laterally diverges upwards from centerline axis 140 and second lobe 126 laterally diverges downwards from centerline axis 140. Cooling air C leaving metering section 112 and entering diffusing section 114 diffuses into lobes 124 and 126, causing the cooling air to spread laterally within diffusing section 114. Side wall 132 and bottom surface 128 direct cooling air C through first lobe 124, and side wall 134 and bottom surface 130 direct cooling air C through second lobe 126.

Diffusing section 114 also includes interlobe region 142. Portion 144 of interlobe region 142 is located between first lobe 124 and second lobe 126. End 146 of interlobe region 142 is adjacent outlet 116 where outlet 116 meets second wall surface 104. Portion 144, located between first lobe 124 and second lobe 126, can extend towards metering section 112 to varying degrees. The location of end 146 of interlobe region 142 relative to trailing edges 136 and 138 can also vary.

In the particular embodiment of FIG. 5, end 146 meets trailing edges 136 and 138 of lobes 124 and 126 at outlet 116. In this embodiment, trailing edges 136 and 138 and first and second lobes 124 and 126 extend to outlet 116 at second wall surface 104. In other embodiments, end 146 of interlobe region 142 is spaced from trailing edges 136 and 138. In these embodiments, trailing edges 136 and 138 and first and second lobes 124 and 126 do not extend to outlet 116 at second wall surface 104.

As shown in FIG. 5, diffusing section 114 also includes first inclined portion 148 and second inclined portion 150. First inclined portion 148 is located adjacent to and extends from bottom surface 128 of first lobe 124. First inclined portion 148 extends from first lobe 124 towards centerline axis 140 and second lobe 126. Second inclined portion 150 is located adjacent to and extends from bottom surface 130 of second lobe 126. Second inclined portion 150 extends from second lobe 126 towards centerline axis 140 and first lobe 124. Depending on the location of cooling hole 106, first inclined portion 148 and second inclined portion 150 can have varying lateral and longitudinal lengths and extend from lobes 124 and 126 at various angles (inclinations). Like the side walls and bottom surfaces, first and second inclined portions 148 and 150 direct cooling air C through lobes 124 and 126 of diffusing section 114.

In some embodiments, first inclined portion 148 and second inclined portion 150 meet together to form a ridge, for example ridge 152 as located between first lobe 124 and second lobe 126 at the intersection of first inclined portion 148 and second inclined portion 150. Ridge 152 aids in separating and directing the flow of cooling air C into first lobe 124 and second lobe 126. The location and angle of ridge 152 within diffusing section 114 can vary to direct cooling air C within diffusing section 114 to suit the location and desired flow profile of cooling hole 106.

Ridge 152 can extend longitudinally to varying degrees between metering section 112 and interlobe region 142. Ridge 152 can extend upstream all the way to metering section 112, beginning where metering section 112 and diffusing section 114 meet as shown in FIG. 4. Alternatively, ridge 152 can begin farther downstream (closer to outlet 116). Ridge 152 can also extend downstream to interlobe region 142 as shown in FIG. 4.

Alternatively, ridge 152 can converge with bottom surfaces 128 and 130 upstream of interlobe region 142. Corresponding changes to the longitudinal lengths of first inclined portion 148 and second inclined portion 150 may accompany any change in the longitudinal extension of ridge 152. In the particular example of FIG. 4, ridge 152 does not extend to outlet 116.

Interlobe region 142 can take various shapes and have different configurations depending on the location and desired flow profile of cooling hole 106. The bottom surface of interlobe region 142 can be flat or curved. A curved (longitudinally convex) bottom surface of interlobe region 142 can facilitate improved flow attachment due to the Coanda effect. Interlobe region 142 can also have a compound trapezoidal shape as shown in FIG. 5. In some embodiments, ridge 154 separates interlobe region 142 into two sides having surfaces in two different planes.

Ridge 154 converges with bottom surface 130 of second lobe 126 at outlet 116 at second wall surface 104 as shown in FIG. 4. The intersection of ridges 152 and 154 at the point where interlobe region 142 meets first inclined portion 148 and second inclined portion 150 forms apex 156. By forming apex 156 upstream of outlet 116, diffusing section 114 facilitates improved flow attachment.

In other embodiments, cooling hole 106 has diffusing section 114 with three channel-like lobes. In some embodiments, instead of first and second inclined portions 148 and 150 and ridge 152, diffusing section 114 can have a surface flush with lobes 124 and 126 (e.g., no ridge) located in between first and second lobes 124 and 126.

Depending on component type, cooling hole or passage location, repair requirements and other considerations, the diffusion portion and outlet features of cooling hole 106 can be located within a metallic wall or substrate, within a thermal barrier coating or other coating layer applied to a wall or substrate, or both. In some embodiments, second wall surface 104 of wall 100 is coated with a thermal barrier coating and/or a bond coating or other coating.

Figure 6:
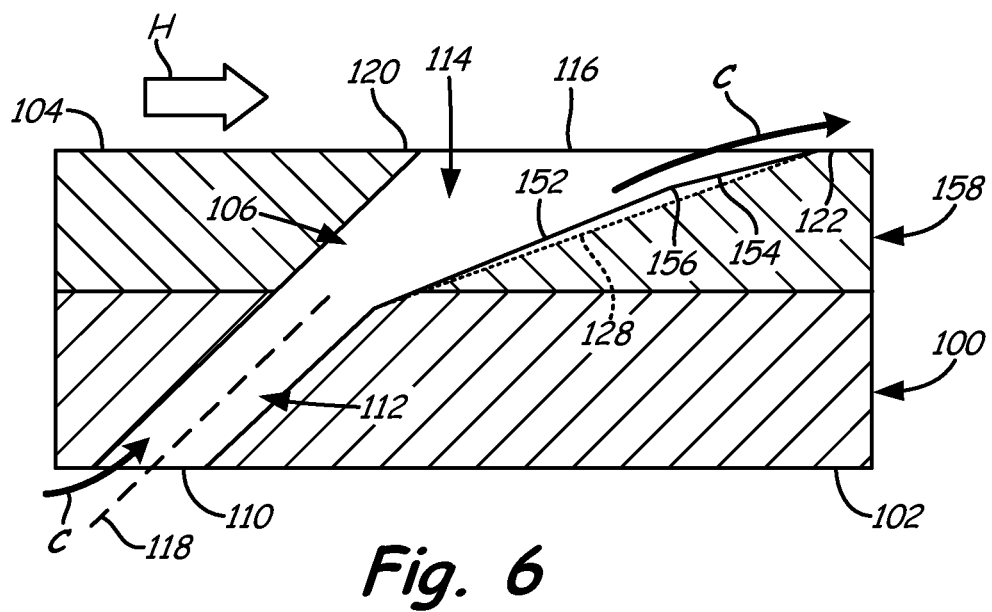
FIG. 6 is a sectional view of a multi-lobed cooling hole extending through a metallic wall and a thermal barrier coating.

FIG. 6 is a sectional view of a cooling hole in which the cooling hole extends through both a wall and a thermal barrier coating applied to one surface of the wall. Thermal barrier coating 158 is located on the surface of wall 100 and cooling hole 106 extends through both wall 100 and thermal barrier coating 158. Second wall surface 104 refers to the outer surface of wall 100, whether it is a metal substrate or a thermal barrier coating. Bonding layers can be applied between thermal barrier coating 158 and the metal substrate (wall 100). The cooling hole geometry and other features feature may remain as described above, regardless of position relative to the wall and coating material or materials. Producing cooling holes 106 that extend through both a wall and thermal barrier coating or other coating can be accomplished by one or more of the methods described herein.

Figure 7:
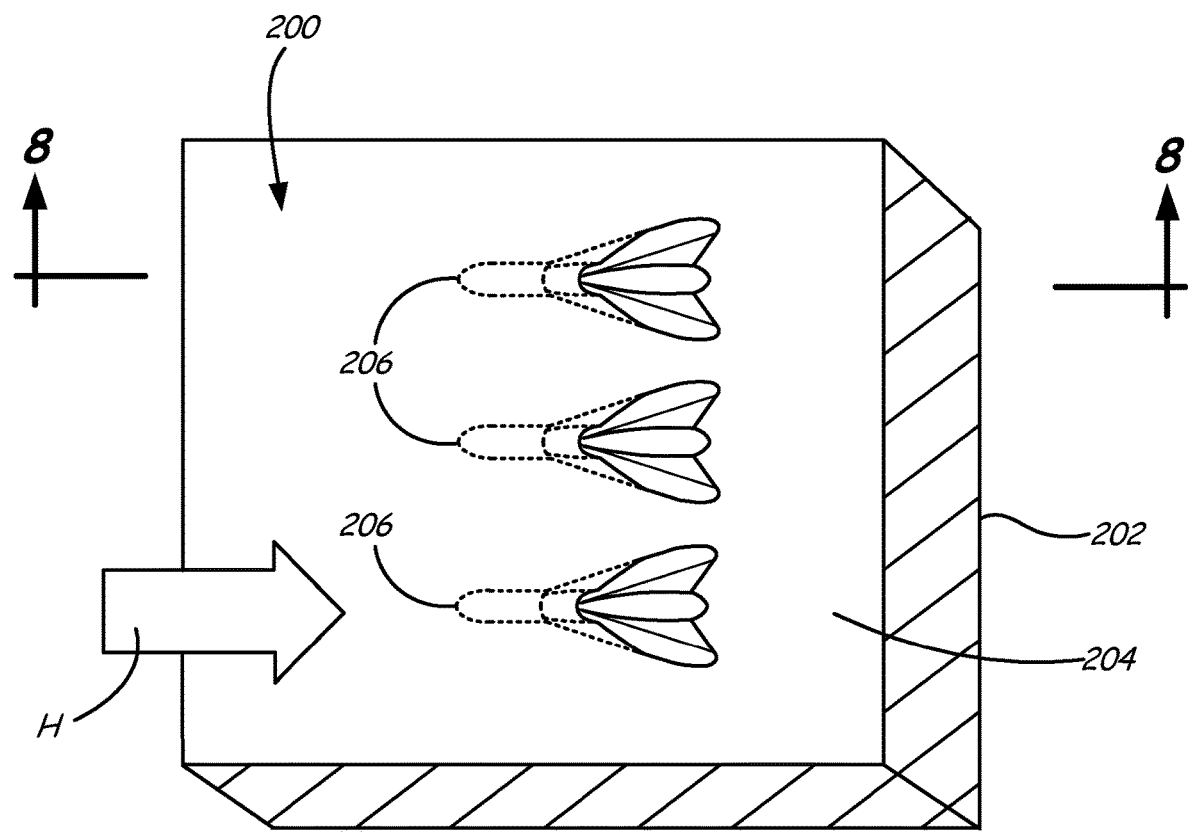
FIG. 7 is a view of a gas flow path wall with tri-lobed cooling holes.

FIG. 7 illustrates a view of gas flow path wall 200 with tri-lobed cooling holes 206. The characteristics of wall 200, cooling hole 206 and the other elements shown in FIGS. 7 through 12 are the same as those stated above. Unless stated otherwise, the numbered elements of FIGS. 7 through 12 correspond with those of previous figures, but have a reference numeral greater in value by 100. By way of example, wall 200 corresponds with wall 100 and incorporates all the features of wall 100 unless otherwise noted, and metering section 212 corresponds with metering section 112 and incorporates all the features of metering section 112 unless otherwise noted, etc. Additional features of cooling hole 206 are described herein.

Figure 8:
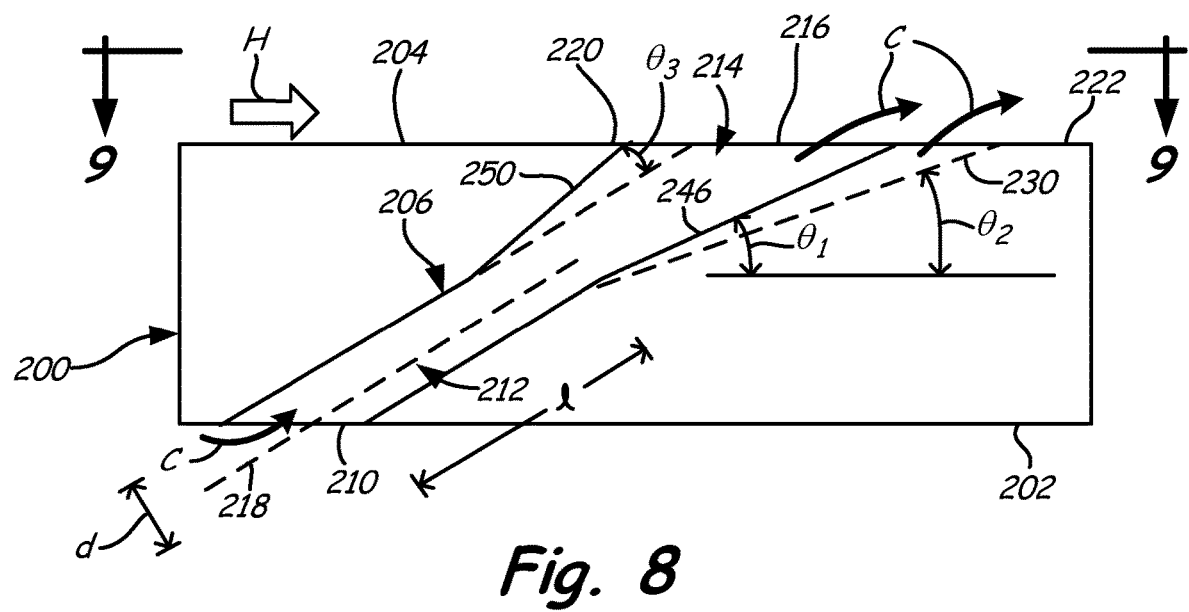
FIG. 8 is a sectional view of a tri-lobed cooling hole as shown in FIG. 7, taken along line 8-8.
Figure 9A:
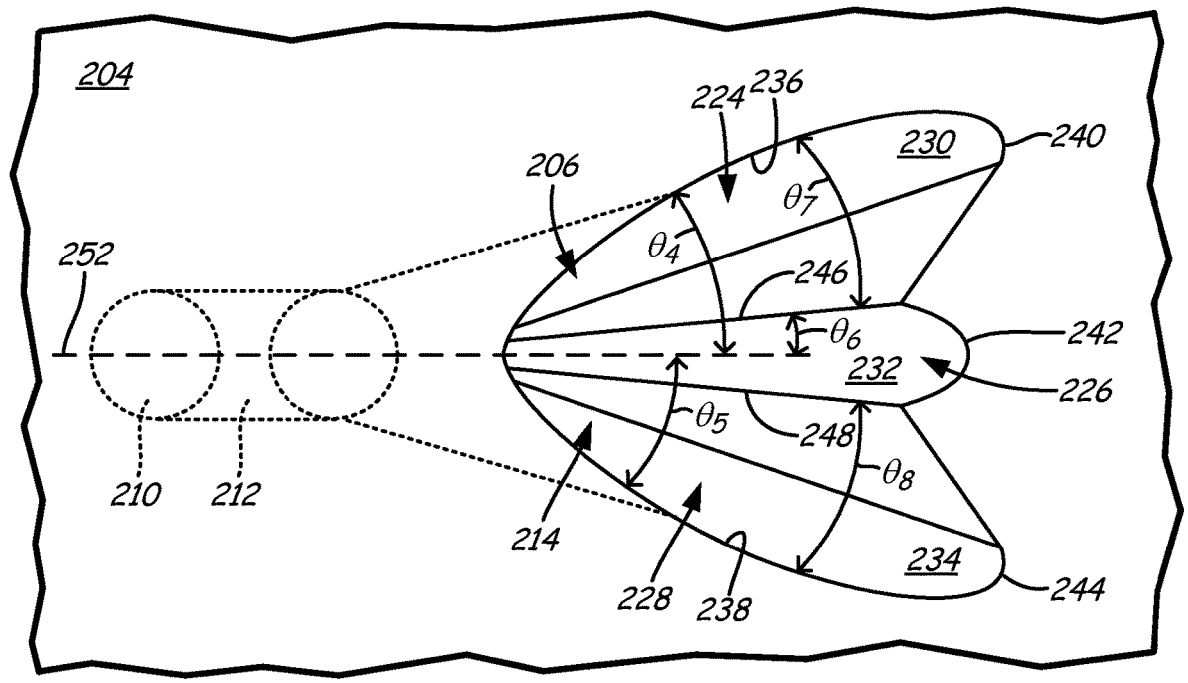
FIG. 9A is a plan view of a tri-lobed cooling hole as shown in FIG. 8, taken along line 9-9.
Figure 9B:
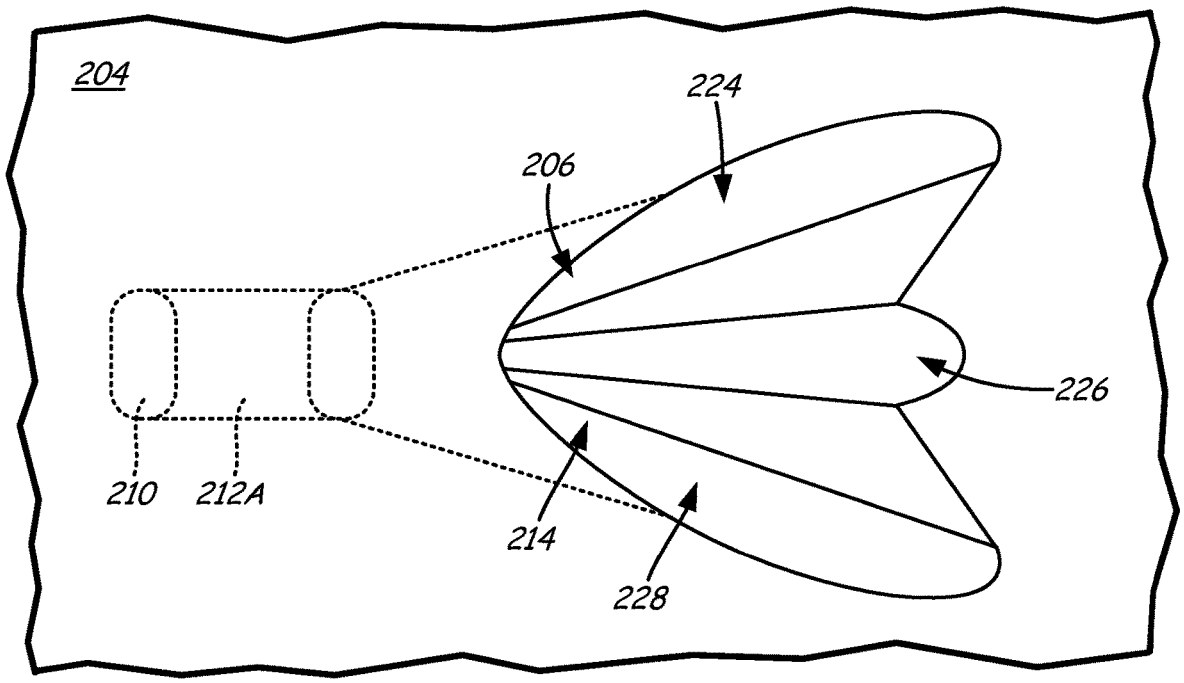
FIG. 9B is a plan view of a tri-lobed film cooling hole having a racetrack metering section.

As shown in FIG. 7, cooling holes 206 have three lobes in the diffusing section of the cooling hole outlet on second wall surface 204. Cooling air flows out of cooling holes 206 and flows through each of the three lobes in the diffusing section. FIGS. 8, 9A and 9B illustrate different embodiments of cooling hole 206. FIG. 8 is a sectional view of tri-lobed film cooling hole 206, for example as shown in FIG. 7, taken along line 8-8. FIG. 9A is a view of cooling hole 206, for example as shown in FIG. 8, taken along line 9-9. FIG. 9B is a view of a cooling hole taken along the same line as FIG. 9A.

As shown in FIG. 9A, diffusing section 214 includes three lobes 224, 226 and 228. Lobes 224, 226 and 228 are surfaces of wall 200 that define the void of cooling hole 206 at diffusing section 214. Each lobe 224, 226 and 228 has a bottom surface (bottom surfaces 230, 232 and 234, respectively). Lobes 224 and 228 each have a side wall along the outer edge of diffusing section 214 (side walls 236 and 238, respectively). Each lobe 224, 226 and 228 also has a trailing edge (trailing edges 240, 242 and 244, respectively).

Lobes 224 and 226 meet along ridge 246, and lobes 226 and 228 meet along ridge 248. As shown in FIG. 8, each lobe 224, 226 and 228 diverges longitudinally from metering section 212. FIG. 8 also shows ridge 246 between lobes 224 and 226. Ridge 246 is inclined with respect to second wall surface 204 as shown by inclination angle $\theta_1$. Ridge 248 is also inclined with respect to second wall surface 204.

Ridge 248 can have the same or a different angle as inclination angle $\theta_1$. Bottom surfaces 230 and 232 of lobes 224 and 226 are also inclined with respect to second wall surface 204 as shown by inclination angle $\theta_2$. Inclination angle $\theta_2$ indicates a downstream angle for each lobe. In the particular embodiment of FIG. 8, bottom surfaces 230 and 232 of lobes 224 and 226 have the same inclination angle $\theta_2$ (downstream angle). Bottom surface 234 of lobe 228 is also inclined with respect to second wall surface 204. Bottom surfaces 230, 232 and 234 do not need to have the same depth or inclination angle.

Cooling air C flowing through diffusing section 214 diverges longitudinally from longitudinal axis 218 as it "attaches" to bottom surfaces 230 and 232 of lobes 224 and 226. Lobes 224, 226 and 228 meet with second wall surface 204 at trailing edges 240, 242 and 244, respectively. In some embodiments, cooling air C passing through cooling hole 206 also diffuses longitudinally near upstream end 220.

The upstream portion of diffusing section 214 is bounded by forward edge 250. Forward edge 250 can be parallel with the upstream edge of metering section 212 (and with longitudinal axis 218), inclined towards upstream end 220, or inclined towards downstream end 222. In exemplary embodiments, forward edge 250 is parallel with the upstream edge of metering section 212 (e.g., no upstream longitudinal diffusion) or inclined towards downstream end 222. As shown in FIG. 8, forward edge 250 is inclined slightly towards upstream end 220 from longitudinal axis 218 (represented by inclination angle $\Theta_3$). In some embodiments, forward edge 250 is inclined towards upstream end 220 to accommodate certain manufacturing methods. In these embodiments, the magnitude of inclination angle $\Theta_3$ may be minimized to less than about 15° and, in another embodiment, to less than about 1°. By minimizing inclination angle $\Theta_3$ and positioning the end of forward edge 250 at second wall surface 204 as far downstream as possible, cooling air C exiting outlet 216 is more effective. In some embodiments, forward edge 250 is inclined towards downstream 222 (rather than upstream end 220) at an inclination angle $\Theta_3$ of up to about −2°.

While cooling air C diffuses longitudinally within diffusing section 214 as shown in FIG. 8, cooling air also diffuses laterally within diffusing section 214 as shown in FIG. 9A. Lobes 224 and 228 diverge laterally with respect to metering section 212. Lobe 224 includes side wall 236 on the side of lobe 224 opposite ridge 246. Lobe 228 includes side wall 238 on the side of lobe 228 opposite ridge 248.

As illustrated in FIG. 9A, lobe 224 diverges laterally in an upward direction away from centerline axis 252, and lobe 228 diverges laterally in a downward direction away from centerline axis 252. In some embodiments, middle lobe 226 does not diverge laterally from metering section 212.

In the particular embodiment of FIG. 9A, middle lobe 226 does not diverge laterally from metering section 212 and middle lobe 226 has a smaller width than diameter d (or $d_h$) of metering section 212. Middle lobe 226 may diverge laterally in the downstream direction with respect to the upstream portion of middle lobe 226. In other embodiments, middle lobe 226 has a greater width than diameter d (or $d_h$) of metering section 212, and also diverges laterally with respect to metering section 212.

Ridges 246 and 248 aid in directing cooling air C into lobes 224, 226 and 228. Ridges 246 and 248 are generally inverted V-shaped portions where adjacent lobes meet. Ridges 246 and 248 can form a sharp edge between the lobes, where edges of adjacent lobes meet at a point. Alternatively, ridges 246 and 248 can be rounded or have other geometric shapes. Ridges 246 and 248 may form a straight line between adjacent lobes. Alternatively, ridges 246 and 248 may be curved as shown in FIG. 9A.

As cooling air C exits metering section 212 and enters diffusing section 214, cooling air C encounters ridges 246 and 248. Ridges 246 and 248 extend farther towards second wall surface 204 than lobes 224, 226 and 228, as shown in FIG. 8, and evidenced by the difference in inclination angles $\theta_1$ (top of ridge) and $\theta_2$ (bottom surface of lobe). As a result, ridges 246 and 248 project towards second wall surface 204 and serve to guide the flow of cooling air C into lobes 224, 226 and 228.

Ridge 246 divides the flow of cooling air C between lobes 224 and 226, causing cooling air C flowing into lobe 224 to diverge laterally to correspond to the shape of lobe 224. Ridge 248 divides the flow of cooling air C between lobes 226 and 228, causing cooling air C flowing into lobe 228 to diverge laterally to correspond to the shape of lobe 228. Ridges 246 and 248 do not necessarily divide the flow of cooling air C between adjacent lobes equally.

Figure 10:
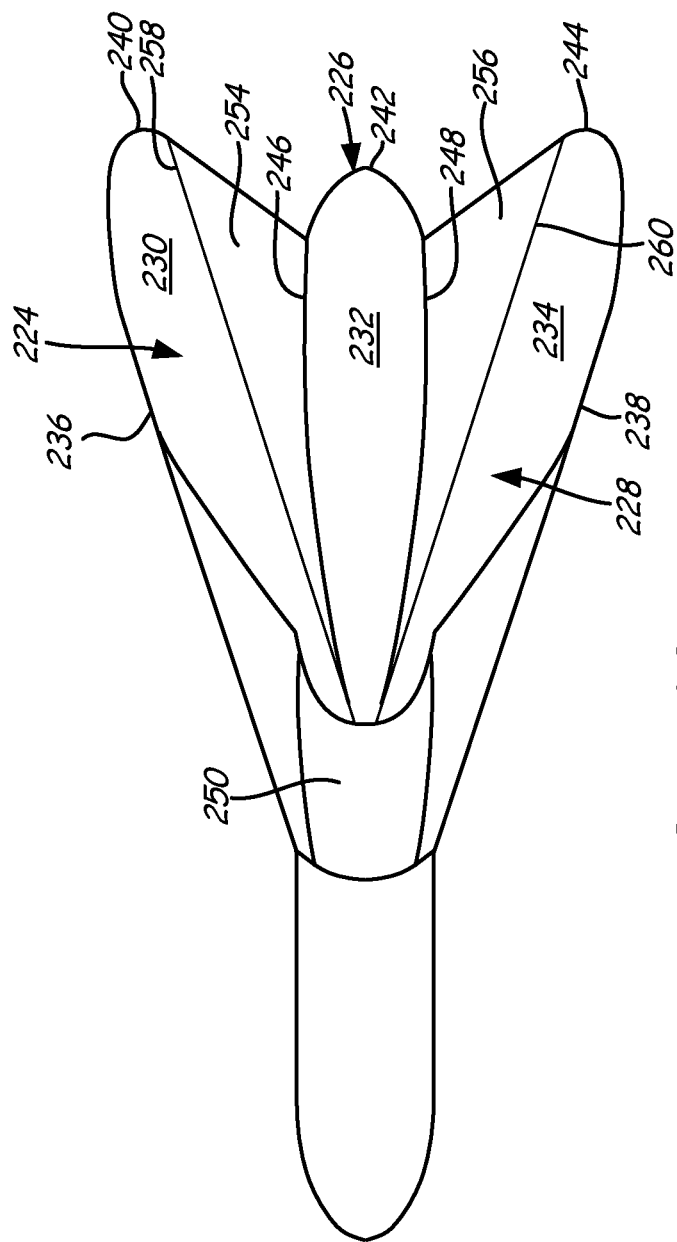
FIG. 10 is a top plan view of a tri-lobed cooling hole.
Figure 12:
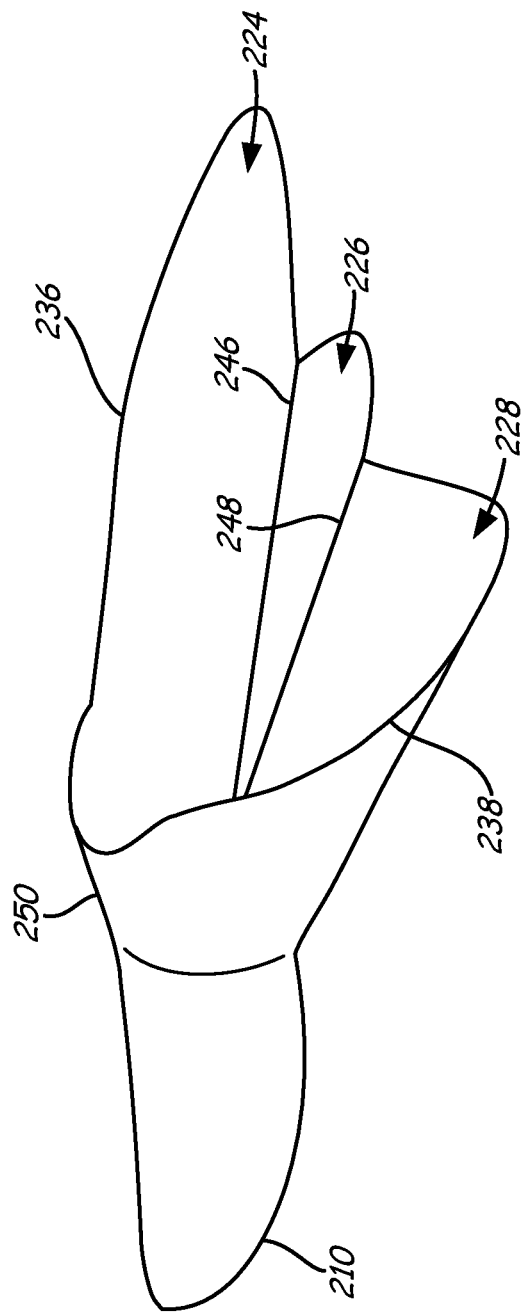
FIG. 12 is a perspective view of a tri-lobed cooling hole.

In exemplary embodiments, bottom surfaces 230, 232 and 234 of lobes 224, 226 and 228, respectively include a curved portion. As shown in FIGS. 9A, 10 and 12, the outer portion of lobes 224 and 228 can also be curved.

Lobe 224 includes a curved surface at side wall 236 and a curved bottom surface 230. Lobe 228 includes a curved surface at side wall 238 and a curved bottom surface 234. Middle lobe 226 includes a curved bottom surface 232. In this embodiment, bottom surfaces 230, 232 and 234 are concave (e.g., curve towards first wall surface 202).

Curved surfaces at side walls 236 and 238 and curved bottom surfaces 230, 232 and 234 may aid in improving the attachment of cooling air C to lobes 224, 226 and 228. By improving cooling flow attachment to the lobes, cooling air C can spread laterally without separation to improve cooling film formation and cooling film effectiveness. In addition to curved surfaces, bottom surfaces 230 and 234 of lobes 224 and 228 can also include a substantially planar portion.

FIG. 10 is a top plan view of cooling hole 206. For the purposes of illustration, wall 200 has been removed to better show cooling hole 206. As shown in FIG. 10, lobe 224 includes planar portion 254 and lobe 228 includes planar portion 256. Planar portion 254 extends from ridge 246 towards side wall 236. The curved portion of bottom surface 230 meets planar portion 254 along line 258, the planar portion 256 extends from ridge 248 towards side wall 238, and the curved portion of bottom surface 234 meets planar portion 256 along line 260. Alternatively, lobe 224 can have a continuous radius of curvature from ridge 246 to side wall 236, and lobe 228 can have a continuous radius of curvature from ridge 248 to side wall 238. Additionally, lobes 224 and 228 can have other geometric shapes between respective side walls 236 and 238 and ridges 246 and 248.

Lobes 224, 226 and 228 meet and blend with second wall surface 204 at trailing edges 240, 242 and 244, respectively. Lobes 224, 226 and 228 can blend with second wall surface 204 in a number of ways. In one embodiment, each lobe blends with second wall surface 204 at the same axial distance from inlet 210, such that trailing edges 240, 242 and 244 form a straight line perpendicular to the flow of cooling air C.

In another embodiment, trailing edges 240, 242 and 244 are equidistant from a point on upstream end 220. In the particular embodiments of FIGS. 8-10, lobes 224, 226 and 228 have trailing edges 240, 242 and 244, respectively, which vary in distance from inlet 210 based on lateral position, roughly forming a W, zigzag or sawtooth like pattern.

Lobes 224, 226 and 228 can vary in depth. For example, inclination angle $\theta_2$ may indicate the inclination of the bottom surface of a lobe with respect to second wall surface 204 (e.g., bottom surface 230 of lobe 224 in FIG. 8). Bottom surfaces 230, 232 and 234 of respective lobes 224, 226 and 228 may have the same inclination angle $\theta_2$ and depth from second wall surface 204. Alternatively, bottom surfaces 230, 232 and 234 may have different inclination angles $\theta_2$, forming lobes of differing depth. For example, bottom surfaces 230 and 234 can have the same inclination angle $\theta_2$ while bottom surface 232 of middle lobe 226 has a different inclination angle $\theta_2$ and a depth different from lobes 224 and 228.

Lobes 224, 226 and 228 may vary in size. As shown in FIGS. 9A, 9B, 10 and 11, lobes 224 and 228 are larger (e.g., have greater width) than middle lobe 226. Angles $\theta_4$, $\theta_5$, $\theta_6$, $\theta_7$ and $\theta_8$ represent the relative dimensions of lobes 224, 226 and 228 within diffusing section 214. Angles $\theta_4$ and $\theta_5$ refer to the angles between centerline axis 252 and side walls 236 and 238, respectively. In exemplary embodiments, angles $\theta_4$ and $\theta_5$ are between about 5° and about 40°. Angle $\theta_6$ refers to the angle between centerline axis 252 and ridge 246 or ridge 248. In exemplary embodiments, angle $\theta_6$ is between about 5° and about 15°. Angle $\theta_7$ refers to the angle between side wall 236 and ridge 246. In exemplary embodiments, angle $\theta_7$ is between about 10° and about 25°. Angle $\theta_8$ refers to the angle between side wall 238 and ridge 248. In exemplary embodiments, angle $\theta_8$ is between about 10° and about 25°.

Figure 11:
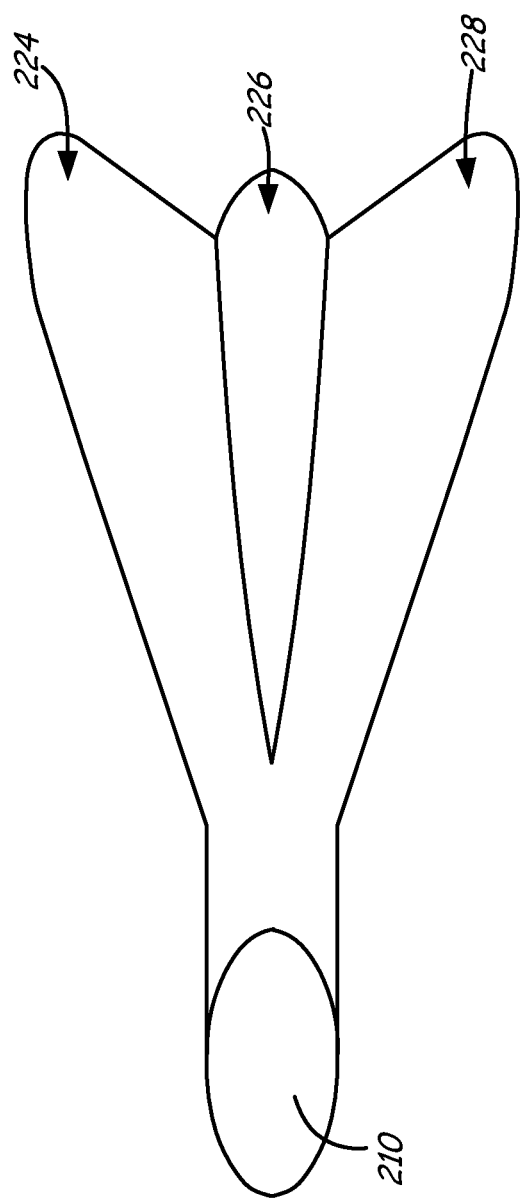
FIG. 11 is a bottom plan view of a tri-lobed cooling hole.

In some embodiments, lobes 224 and 228 have the same size as illustrated in FIGS. 9A, 10 and 11. In alternate embodiments, lobes 224 and 228 have varying sizes or shapes to better laterally diffuse cooling air C according to the geometry of the component containing cooling hole 206. In other embodiments, middle lobe 226 has a width similar to the widths of lobes 224 and 228.

Depending on the method used to manufacture cooling holes 206, the depths and lengths of metering section 212 and diffusing section 214 can be adjusted along wall 200 of the component in need of cooling. For example, in embodiments where cooling holes 206 are manufactured using a one-piece electric discharge machining (EDM) electrode, the electrode can machine wall 200 at various depths. The electrode can be positioned to a shallow depth, bringing diffusing section 214 closer to second wall surface 204, or positioned at a greater depth, decreasing the length of metering section 212 and positioning diffusing section 214 closer to first wall surface 202. With this method of manufacturing using a one-piece EDM electrode, the size (width) of lobes 224, 226 and 228 near diffusing section 214 can be affected by the positioning of the electrode during discharge.

Exemplary shapes and sizes of lobes 224, 226 and 228 depend on a number of factors including: the thickness of wall 200, the angle at which metering section 212 of cooling hole 206 is inclined relative to wall 200, and any curvature present on wall 200 in the vicinity of cooling hole 206.

Lobes 224, 226 and 228 and ridges 246 and 248 diffuse cooling air C laterally within diffusing section 214. Ridges 246 and 248 aid in separating the flow of cooling air C so that cooling air flows through each lobe 224, 226 and 228. Curved bottom surfaces 230, 232 and 234 and side walls 236 and 238 aid in the attachment of cooling air C. Attachment of cooling air C to lobes 224 and 228 spreads out the flow laterally. Attachment of cooling air C to middle lobe 226 reduces the likelihood of flow separation.

In some other cooling hole designs, flow separation may occur at high blowing ratios, as the cooling air is forced to diverge laterally, leaving less cooling air coverage at the "center." The presence of three lobes 224, 226 and 228 ensures a more adequate flow of cooling air C to fill the "center" of the formed cooling film, reducing the likelihood of flow separation even at high blowing ratios.

Reduced flow separation increases the effectiveness of the film cooling. As a result, smaller quantities of cooling air C can be used to achieve the same level of cooling, providing an overall increase in aerodynamic and engine performance by reducing the amount of bleed air necessary for cooling. Additionally, improved cooling film formation can reduce the number of cooling holes 206 needed to sufficiently cool wall 200.

Figure 13:
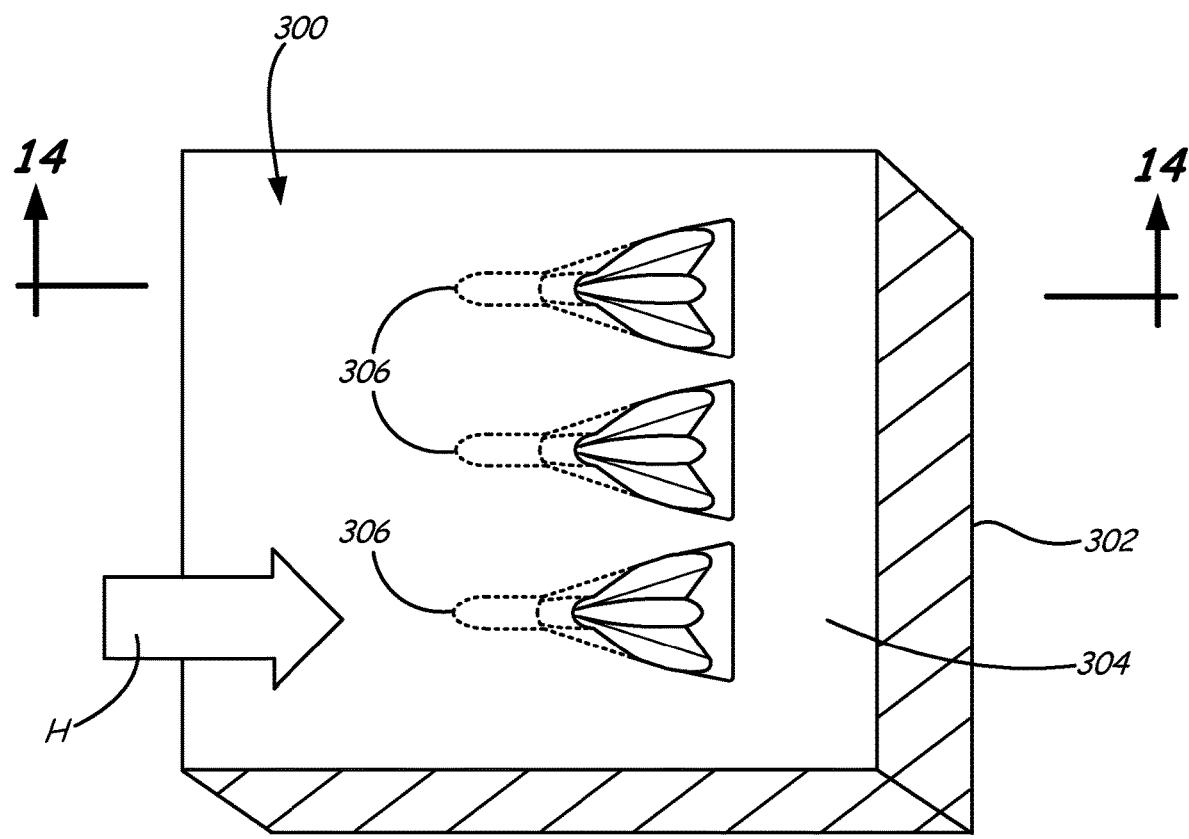
FIG. 13 is a view of a gas flow path wall with multi-lobed cooling holes.

FIG. 13 is a view of gas flow path wall 300 with multi-lobed film cooling holes 306. The characteristics of wall 300, cooling hole 306 and the other elements shown in FIGS. 13 through 20 are the same as those stated above. Unless stated otherwise, the numbered elements of FIGS. 13 through 20 correspond with those of previous figures, but have a reference numeral greater in value by 100 or 200. By way of example, wall 300 corresponds with walls 100 and 200 and incorporates all their features unless otherwise noted, and metering section 312 corresponds with metering sections 112 and 212 and incorporates all their features unless otherwise noted, etc. Additional features of cooling hole 306 are described herein.

Figure 14:
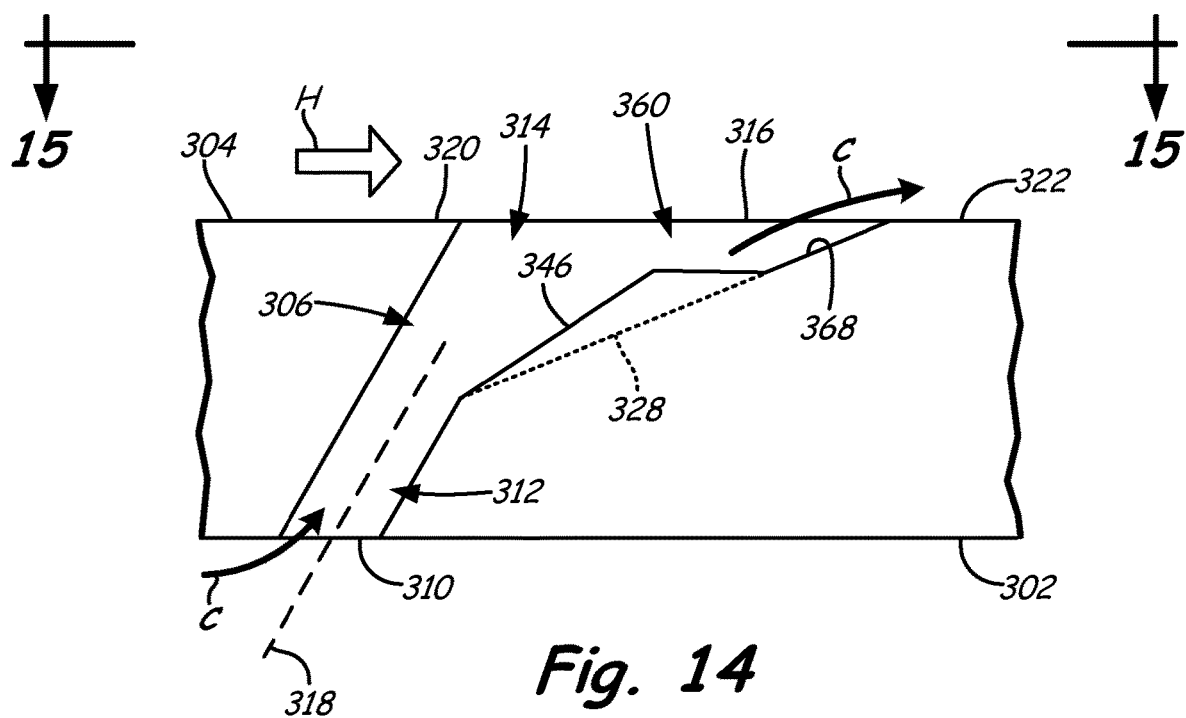
FIG. 14 is a sectional view of a multi-lobed cooling hole as shown in FIG. 13, taken along line 14-14.
Figure 15:
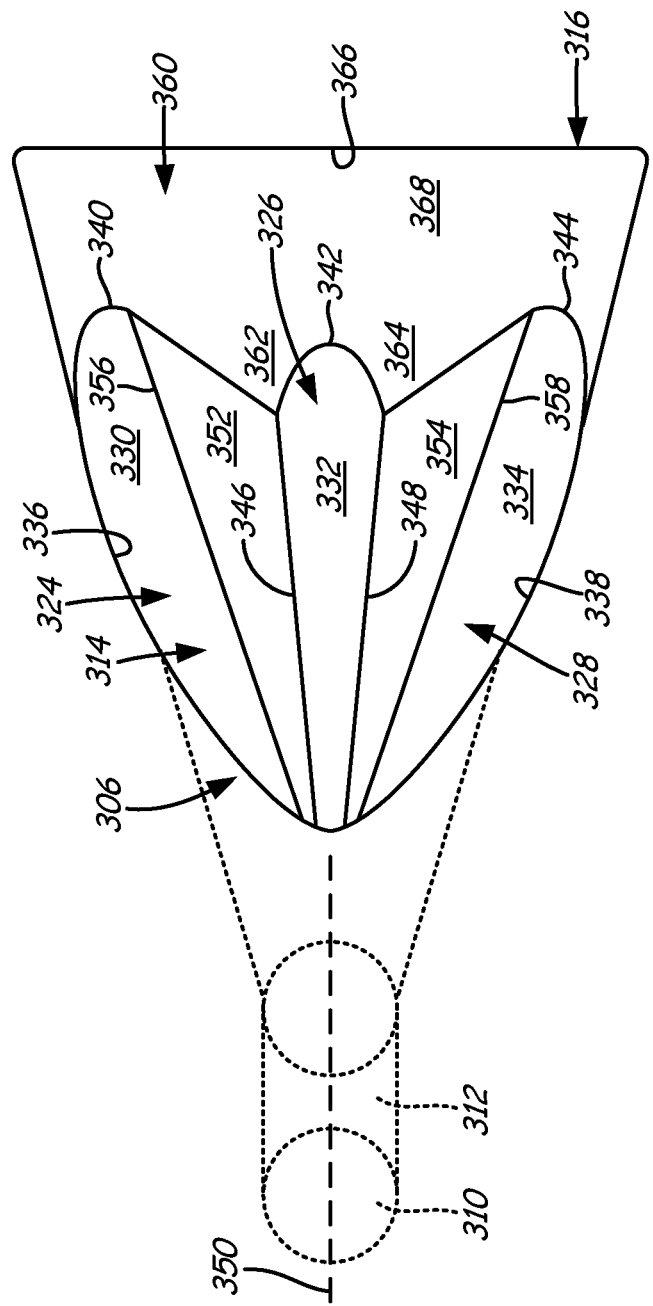
FIG. 15 is a view of a multi-lobed cooling hole as shown in FIG. 14, taken along line 15-15.

FIG. 14 is a sectional view of multi-lobed film cooling hole 306 as shown in FIG. 13, taken along line 14-14. FIG. 15 is a view of cooling hole 306 as shown in FIG. 14, taken along line 15-15. For the purposes of illustration, wall 300 has been removed from FIG. 15 to better show cooling hole 306.

As shown in FIG. 15, diffusing section 314 includes three channel-like lobes 324, 326 and 328. Lobes 324, 326 and 328 are surfaces of wall 300 that define the void of cooling hole 306 at diffusing section 314. Each lobe 324, 326 and 328 has a bottom surface (bottom surfaces 330, 332 and 334, respectively). Lobes 324 and 328 each have a side wall along the outer edge of diffusing section 314 (side walls 336 and 338, respectively). Each lobe 324, 326 and 328 also has a trailing edge (trailing edges 340, 342 and 344, respectively). Lobes 324 and 326 meet along ridge 346, and lobes 326 and 328 meet along ridge 348.

Diffusing section 314 also includes transition region 360. Transition region 360 separates lobes 324, 326 and 328 from outlet 316. In some embodiments, transition region 360 also includes portions that are located between adjacent lobes, as shown in FIG. 15. For example, portion 362 of transition region 360 is located between first lobe 324 and second lobe 326 and portion 364 is located between second lobe 326 and third lobe 328. End 366 of transition region 360 is adjacent outlet 316 where the outlet meets outer wall surface 304. Portion 362, located between first lobe 324 and second lobe 326, and portion 364, located between second lobe 326 and third lobe 328, can extend towards metering section 312 to varying degrees. In the particular embodiment of FIG. 15, portions 362 and 364 are present only near the respective trailing edges 340, 342 and 344 of lobes 324, 326 and 328. The location of end 366 of transition region 360 relative to trailing edges 340, 342 and 344 can also vary.

In the particular embodiment shown in FIG. 15, end 366 is spaced from trailing edges 340, 342 and 344. In this embodiment, trailing edges 340, 342 and 344 and first, second and third lobes 324, 326 and 328 do not extend to outlet 316 or outer wall surface 304. Instead, portion 368 of transition region 360 is located between trailing edges 340, 342 and 344 and outlet 316.

Figure 16:
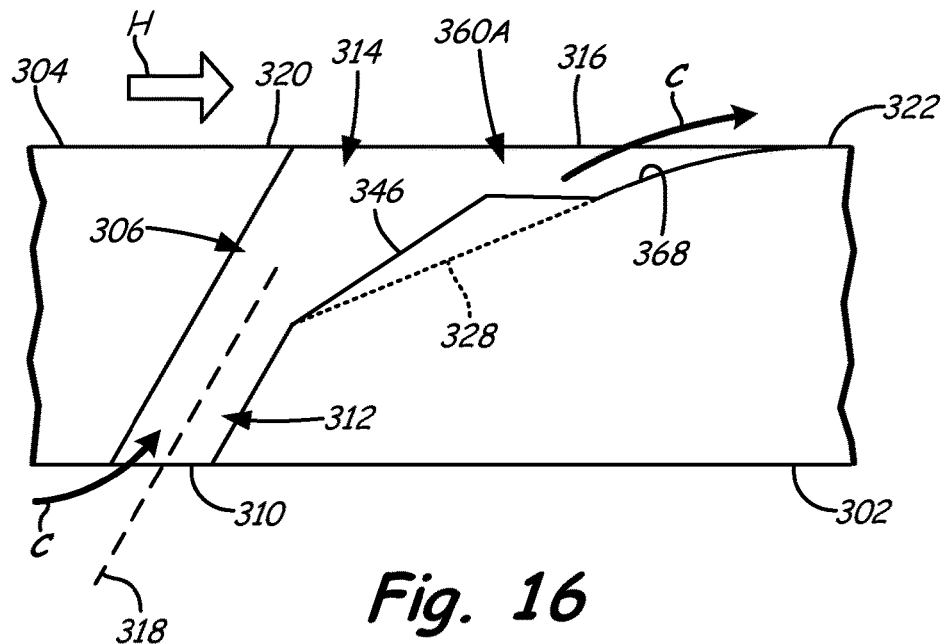
FIG. 16 is a sectional view of a multi-lobed cooling hole.

In some embodiments, transition region 360 spans from trailing edge 340 to trailing edge 344 as shown in FIG. 15. In further embodiments, end 366 of transition region 360 is straight as shown in FIG. 15. Transition region 360 (and portions 362, 364 and 368) can take various shapes and have different configurations depending on the location and desired flow profile of cooling hole 306. The bottom surface of transition region 360 can be flat or curved. A curved (longitudinally convex) bottom surface of transition region 360 can facilitate improved flow attachment due to the Coanda effect. FIG. 16 illustrates a sectional view of one embodiment of multi-lobed cooling hole 306A in which portion 368 of transition region 360A is longitudinally convex.

Adding transition region 360 to diffusing section 314 improves the thermo-mechanical fatigue tolerance of multi-lobed cooling hole 306. Without transition region 360, the trailing edge of cooling hole 306 (where outlet 316 and outer wall surface 304 meet) may include sharp edges or corners at the trailing edge of ridges 346 and 348 and at trailing edges 340, 342 and 344 of lobes 324, 326 and 328. Sharp edges and corners may be susceptible to thermo-mechanical fatigue. Over time, cracks may develop in such areas due to the temperature cycling that occurs during operation. Cracks reduce cooling effectiveness and performance, and may lead to failure, requiring replacement or repair. Replacing and repairing components is costly both in terms of materials and in aircraft downtime. By incorporating transition region 360 into diffusing section 314, sharp edges and corners are blended into smoother transitions that are less susceptible to thermo-mechanical fatigue. Smoother transitions near ridges 346 and 348 and trailing edges 340, 342 and 344 also reduce the likelihood that cooling air C will "jet off," instead of forming a cooling film along outer wall surface 304.

In the particular embodiments of FIGS. 14 and 15, transition region 360 does not contain ridges and ridges 346 and 348 do not extend to outlet 316. Instead, ridges 346 and 348 transition (taper) to the same depth as bottom surfaces 330, 332 and 334. As shown in FIG. 14, portion 368 of transition region 360 separates ridges 346 and 348 from outlet 316. In alternative embodiments, ridges 346 and 348 may extend into transition region 360.

Figure 17:
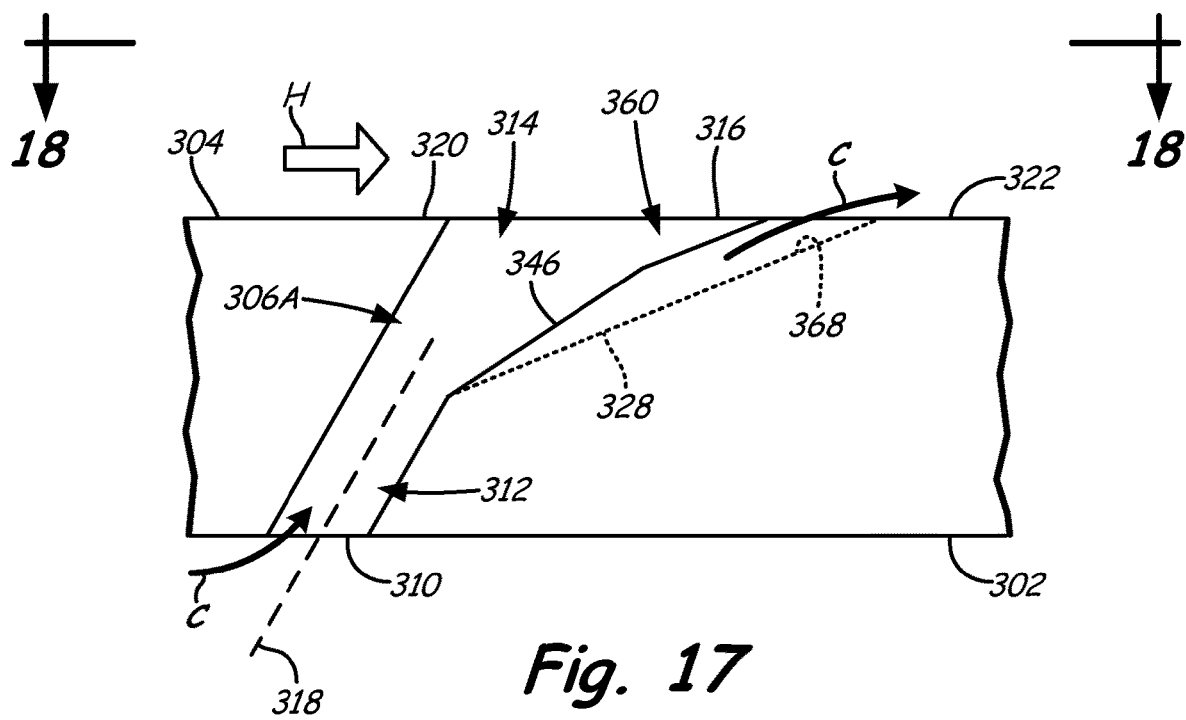
FIG. 17 is a sectional view of a multi-lobed cooling hole.
Figure 18:
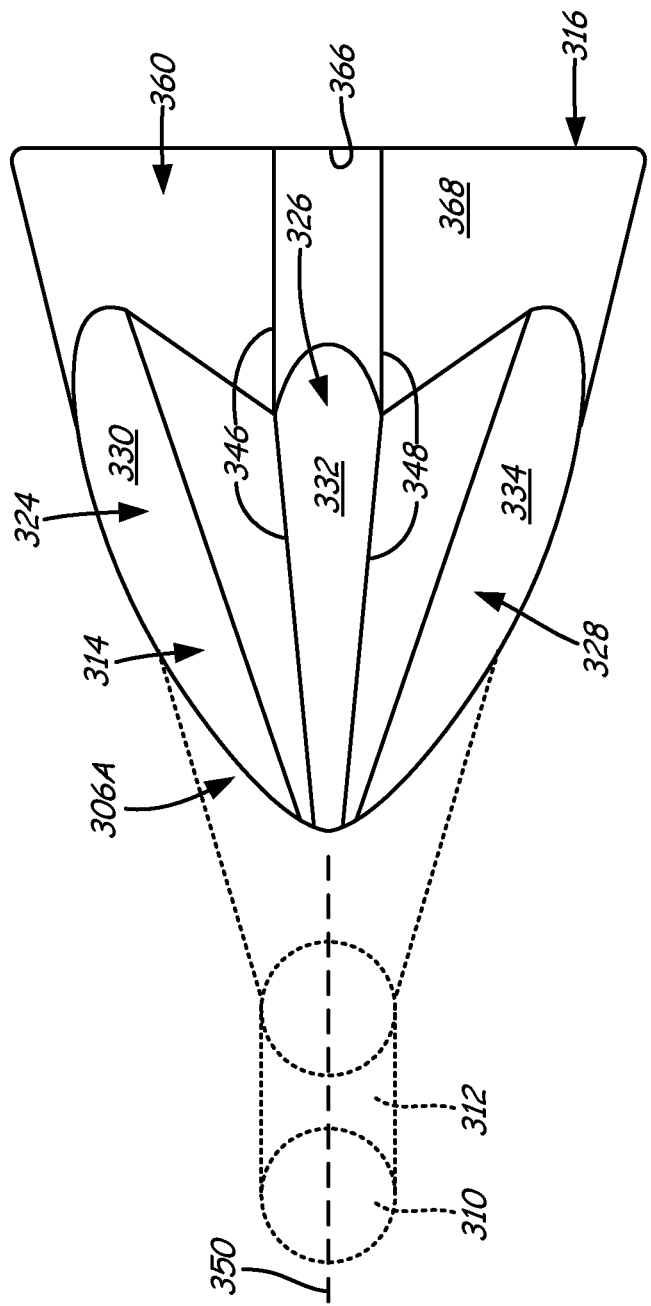
FIG. 18 is a view of a multi-lobed cooling hole as shown in FIG. 17, taken along line 18-18.

FIGS. 17 and 18 illustrate cooling hole 306A, in which ridges 346 and 348 extend through portion 368 of transition region 360 to outlet 316. FIG. 17 is a sectional view of multi-lobed film cooling hole 306A through centerline axis 350, in the fashion of FIG. 14. For the purposes of illustration, wall 300 has been removed from FIG. 18 to better show cooling hole 306A. Ridges 346 and 348 can extend through transition region 360 having the same height relative to portion 368 as to bottom surfaces 330, 332 and 334. Alternatively, ridges 346 and 348 can increase or decrease in height as they proceed downstream through portion 368.

In some embodiments, ridges 346 and 348 transition (taper) to the same depth as portion 368 so that they do not extend downstream all the way to outlet 316. Ridges 346 and 348 in transition region 360 help prevent the flow of cooling air C from separating downstream of lobes 324, 326 and 328. In other embodiments, ridges 346 and 348 do not extend through transition region 360, but ribs are located in transition region 360 instead.

Figure 19:
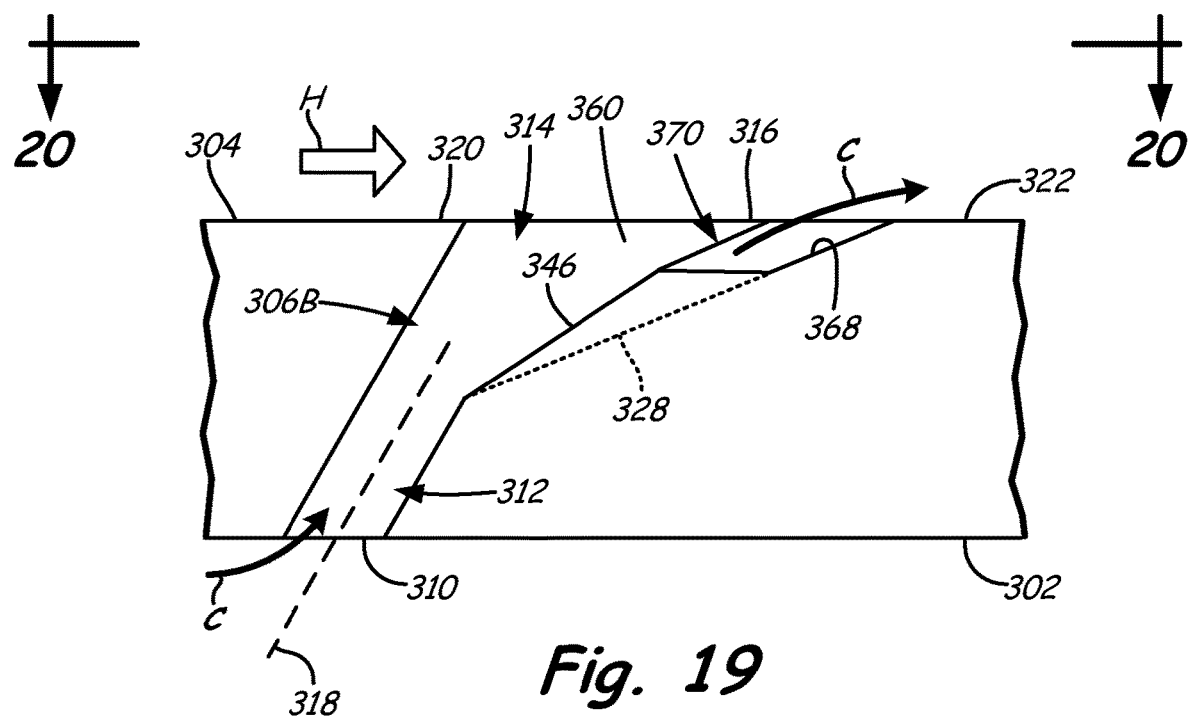
FIG. 19 is a sectional view of a multi-lobed cooling hole.
Figure 20:
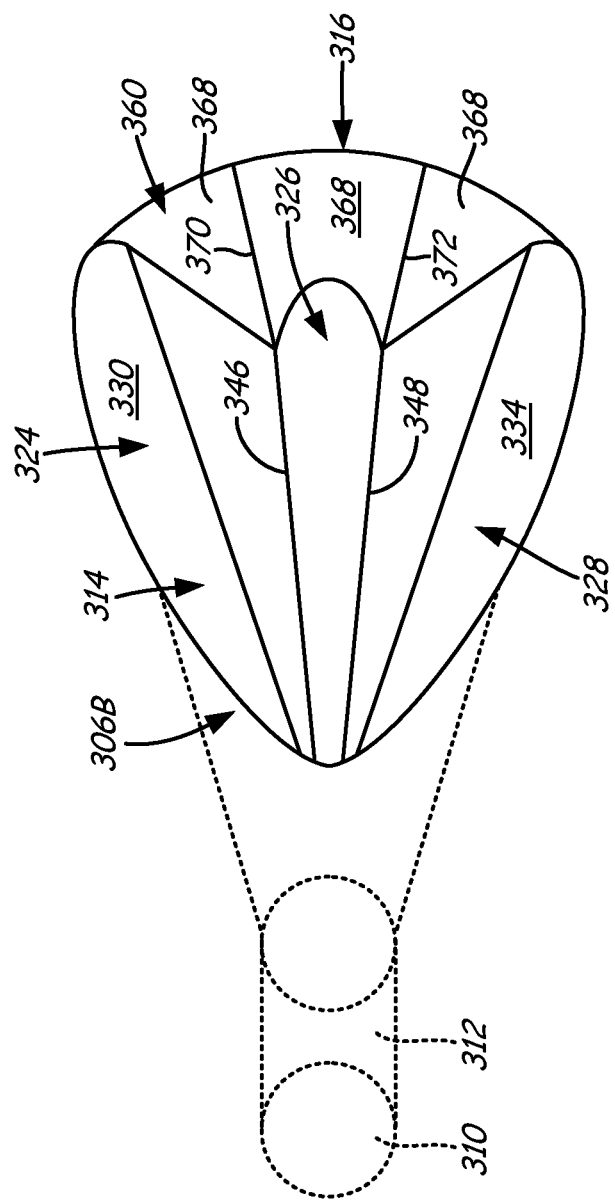
FIG. 20 is a view of a multi-lobed cooling hole as shown in FIG. 19, taken along line 20-20.

FIGS. 19 and 20 illustrate cooling hole 306B, in which ribs 370 and 372 are located on portion 368 of transition region 360. FIG. 19 is a sectional view of multi-lobed film cooling hole 306B through centerline axis 350 in the same fashion of FIGS. 14, 16 and 17. For the purposes of illustration, wall 300 has been removed from FIG. 20 to better show cooling hole 306B. Like ridges 346 and 348, ribs 370 and 372 help prevent the flow of cooling air C from separating downstream of lobes 324, 326 and 328. Ribs 370 and 372, however, do not necessarily follow the same path as ridges 346 and 348.

In some embodiments, ribs 370 and 372 are parallel to and aligned with ridges 346 and 348, respectively. In other embodiments, for example as shown in FIG. 20, ribs 370 and 372 are aligned with, but are not parallel to, ridges 346 and 348. The ribs and ridges are aligned in that the upstream ends of ribs 370 and 372 meet the downstream ends of ridges 346 and 348. However, ribs 370 and 372 diverge laterally so that the downstream ends of ribs 370 and 372 are farther apart than their upstream ends. By increasing their lateral divergence, ribs 370 and 372 can better spread cooling air C throughout diffusing section 314.

As with ridges 346 and 348, ribs 370 and 372 can extend through transition region 360 having the same height relative to portion 368 as ridges 346 and 348 have to bottom surfaces 330, 332 and 334. Alternatively, ribs 370 and 372 can have lesser or greater heights or increase or decrease in height as they proceed downstream through portion 368. In some embodiments, ribs 370 and 372 transition (taper) to the same depth as portion 368 so that they do not extend downstream all the way to outlet 316.

FIG. 20 illustrates outlet 316 having a curved trailing edge rather than a straight trailing edge. In other embodiments, outlet 316 may have a trailing edge with a combination of curved and straight portions (e.g., the trailing edge is curved at the lateral edges and straight in the center).

While FIGS. 3 through 20 illustrate specific embodiments of cooling holes 106, additional embodiments may employ one or more features from each embodiment illustrated. For example, diffusing section 114 can have two, three or more lobes; cooling holes 106 can have lobes arranged in an asymmetric configuration; metering section 112 can have an axial cross section of various shapes, etc.

The gas turbine engine components, gas path walls and cooling passages described herein can be manufactured using one or more of a variety of different processes. These techniques provide each cooling hole and cooling passage with its own particular configuration and features, including, but not limited to, inlet, metering, transition, diffusion, outlet, upstream wall, downstream wall, lateral wall, longitudinal, lobe and downstream edge features, as described above. In some cases, multiple techniques can be combined to improve overall cooling performance or reproducibility, or to reduce manufacturing costs.

Suitable manufacturing techniques for forming the cooling configurations described here include, but are not limited to, electrical discharge machining (EDM), electron beam (EB) machining, laser drilling, laser machining, electrical chemical machining (ECM), water jet machining, casting, mechanical machining and combinations thereof. Electrical discharge machining includes both machining using a shaped electrode as well as multiple pass methods using a hollow spindle or similar electrode component. Laser machining methods include, but are not limited to, material removal by ablation, laser drilling, water or fluid-jet guided laser machining (fluid jet or water jet/laser coupled machining), two-step laser machining, trepanning and percussion laser machining. Mechanical machining methods include, but are not limited to, milling, drilling and grinding.

The gas flow path walls and outer surfaces of some gas turbine engine components include one or more coatings, such as bond coatings, thermal barrier coatings, abrasive coatings, abradable coatings and erosion or erosion-resistant coatings. For components having a coating, the inlet, metering portion, transition, diffusion portion and outlet cooling features may be formed prior to coating application, after a first coating (e.g., a bond coating) is applied, or after a second or third (e.g., interlayer) coating process, or a final coating (e.g., environmental or thermal barrier) coating process. Depending on component type, cooling hole or passage location, repair requirements and other considerations, the diffusion portion and outlet features may be located within a wall or substrate, within a thermal barrier coating or other coating layer applied to a wall or substrate, or based on combinations thereof. The cooling geometry and other features may remain as described above, regardless of position relative to the wall and coating materials or airfoil materials.

In addition, the order in which cooling features are formed and coatings are applied may affect selection of manufacturing techniques, including techniques used in forming the inlet, metering portion, transition, outlet, diffusion portion and other cooling features. For example, when a thermal barrier coat or other coating is applied to the outer surface of a gas path wall before the cooling hole or passage is produced, laser ablation or laser drilling may be used. Alternatively, either laser drilling or water jet machining may be used on a surface without a thermal barrier coat. Additionally, different machining methods may be more or less suitable for forming different features of the cooling hole or cooling passage, for example, different EB, EDM, laser machining and other machining techniques may be used for forming the outlet and diffusion features, and for forming the transition, metering and inlet features.

Two-Step Laser Drilling of Multi-Lobed Diffuser Holes

In two-step laser drilling and machining techniques, two different laser systems or laser pulsing apparatuses are used. For example, a first (e.g., ablation) laser may be used to machine features in a first material, e.g., a coating material such as a ceramic or bond coating or thermal barrier coating (TBC), or other non-metallic, non-electrically conductive material. A second (e.g., conventional drilling) laser may be used to machine features in a second material, e.g., a metal material such as a substrate, for example a substrate formed of a high temperature alloy or superalloy.

Two-step laser techniques are utilized to form different portions of a cooling hole in different parts of a component or gas flow path wall, for example to form a metering portion in a substrate or bond coating, and to form a diffusion portion in a bond coating or thermal barrier coating. More generally, the different parts of the cooling hole are formed in a combination of substrate and coating layers, using one or both laser systems.

Two-step laser machining techniques can also be used both for original part manufacture and in refurbishment and repair, as described below. In addition, these techniques can be used to restore or provide cooling holes with metering or diffusion features in, for example, a combination of metal substrate and non-metallic coating materials.

Depending on application and system designs, the two laser systems are distinguished by power output, pulse duration and pulse frequency. In some applications, for example, the ablation or ablative laser utilizes a high-speed galvo-scanning laser laser beam with a relatively lower power, for example 10-100 W and a higher pulse frequency, for instance 1k-200k Hz. In many applications the operational pulse duration resides in the nano ($10^{-9}$) to femto ($10^{-15}$) second range, this is referred to as a cold processing laser system.

The drilling or machining laser used to form the metering section typically utilizes a relatively higher power (150-400 W), a relatively lower pulse frequency (5-100 Hz), and a relatively long pulse duration range of 0.5-2.5 milliseconds ($10^{-3}$). Alternatively, a higher pulse frequency can be used, for example about 50 to 1,000 Hz (1 kHz) or more, which will result in a lower power and a shorter pulse duration (nanosecond range). In further designs, the frequency range is much broader, for example 80 Hz-200 kHz, where a continuous-beam laser is used, for example a laser system with a variable or modulated beam, such as a variable or modulated laser power system.

Suitable laser systems for this and other laser techniques described here include, but are not limited to, fiber lasers, diode lasers, pulsed lasers and YAG lasers. Suitable wavelength ranges include IR, visible and UV.

Figure 21:
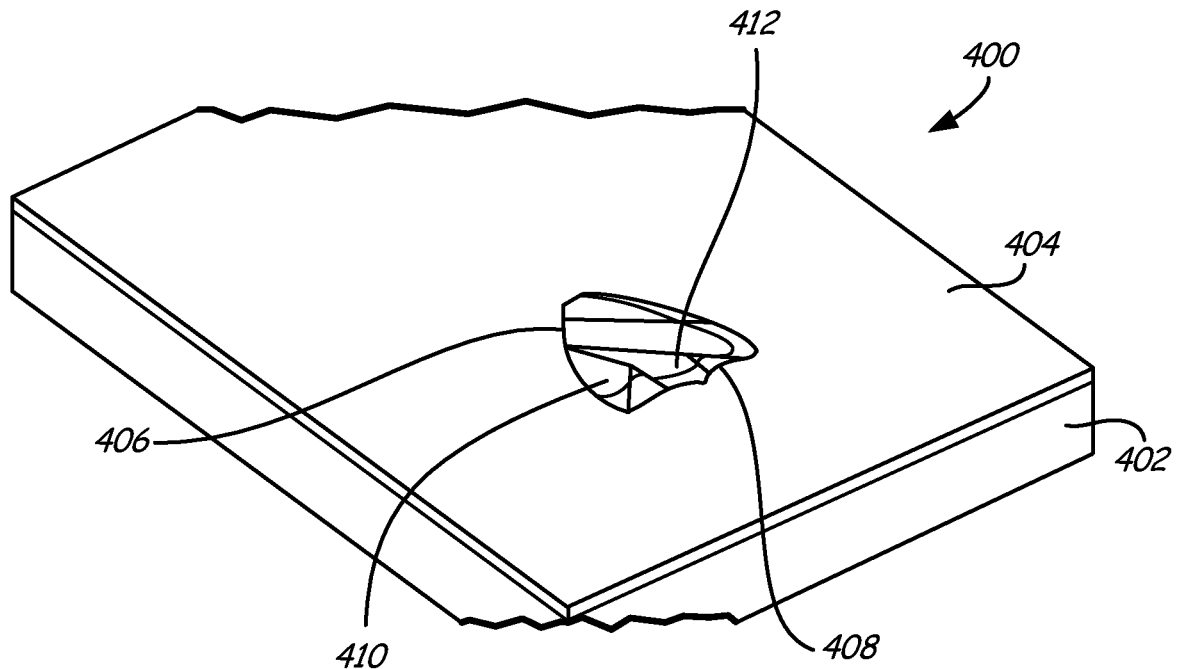
FIG. 21 is a perspective view of a machined part, for example a component for a gas turbine engine.

FIG. 21 is a perspective view of machined metallic part 400, for example a component for a gas turbine engine, where the component is exposed to hot gas or working fluid flow. Part 400 includes substrate 402 and coating 404, for example a metallic coating such as a bond coating. Alternatively, coating 404 is non-metallic, for example a thermal or thermal barrier coating (TBC), or coating 404 includes a bond coating and a thermal barrier coating.

In this particular example, part 400 has cooling hole 406 with a three-lobed diffusion portion extending to downstream trailing edge 408. In contrast to other techniques, a two step laser drilling process (alternatively, a fluid-guided laser drilling process or a focused beam machining process, as described below) is used to form lobes 410 extending between longitudinal ridges or dividers 412, providing improved cooling flow efficiency along hot gas path surface 404 downstream of cooling hole 406 at trailing edge 408.

Figure 22:
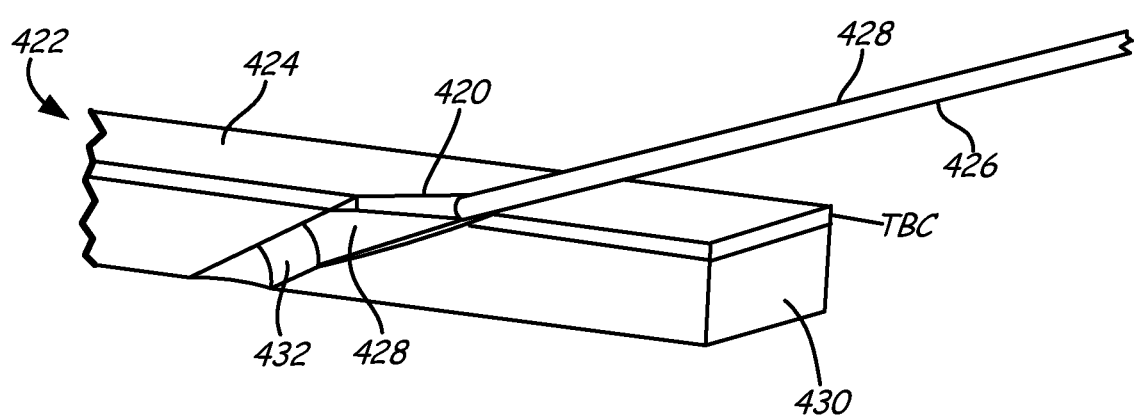
FIG. 22 is an illustration of a two-step laser machining process.

FIG. 22 is an illustration of a two-step laser machining process for forming cooling hole 420 in component 422 with surface 424 exposed to working fluid flow. In this particular step, high-speed galvo-scanning laser (or laser beam) 426 is used to ablate a coating such as thermal barrier coating (TBC), forming diffusion portion 428 for cooling hole 420 in coating layer TBC, with an outlet in hot gas flow surface 424 along coating TBC, or for forming diffusion portion 428 in a combination of coating layer TBC and substrate 430.

In this step, laser 426 is produced by an ablation laser system, for example a higher pulse frequency laser system as described above. In another step, either before or after this step, a high power drilling laser (or laser beam) 428 is used, for example using a beam from a lower pulse frequency laser system to form metering portion 432 with an inlet in substrate 430.

In some applications, first and second lasers 426 and 428 are formed using the same laser system along a similar path, as shown in FIG. 22, for example by increasing or decreasing the pulse frequency and adjusting the power level. More generally, first and second lasers 426 and 428 machine cooling hole 420 along different paths (see other figures below), and first and second lasers 426 and 428 may be generated by different physical laser systems.

Water or Fluid Jet Guided Laser Machining

In laser diffusion machining, a laser beam carves out a diffuser shape for a cooling hole. A conventional fixed beam laser system uses a multi-axis computer numeric control to guide (or raster) the fluid/laser stream across the material surface to position the laser beam for the machining of three dimensional features. In fluid jet guided laser machining, as described here, a regulated fluid stream is used to focus the laser beam, and for material removal.

In general, the water-jet or fluid-stream guided laser principle is similar to a fiber-optic type light guide or light channel, and may be delivered with a fixed beam director apparatus. Alternatively, different fluids can be used to couple with the laser beam, for example water, oil and other fluids.

In a directional fluid laser coupled machining system, various laser devices are suitable. These include, but are not limited to, YAG or YaG (yttrium aluminium garnet) lasers such as Nd:YAG (neodymium-doped yttrium aluminium garnet) or erbium YAG lasers, and fiber or diode pulsed solid state based laser systems. Suitable laser wavelengths include infrared (IR) and near-IR lasers operating at around 1000 nm, for example 1060-1070 nm. Alternatively UV laser systems may be utilized.

In the fluid jet guided laser technique, the fluid stream size can be varied to change the beam size in real time. This allows a hole or passage with varying cross-sectional shape and area to be formed in a substrate, for example a hot flow path wall or other structure, with or without a coating such as a thermal barrier coating, in a single cutting or drilling pass or step. Fluid-guided laser machining thus contrasts with other techniques, where the cutting or drilling width is fixed. Fluid-guided laser machining also contrasts with techniques where different machining tools or laser systems are used for the substrate and for the coating, for example an EDM system for the substrate and a laser for the coating.

The fluid stream also provides cooling during machining, reducing the vapor plume and providing benefits with respect to recast reduction. The cooling fluid that guides the laser may also improve focusing for more precise hole formation with shaped corners, edges and other features, while removing ablated material before resolidification. In addition, fluid-guided laser systems can be rastered to provide flat features, as well as curved features following a Gaussian or cylindrical beam profile.

This approach also contrasts with techniques where a particular machining tool or system is used for the substrate and the coating is not machined, resulting in coat-down and other effects that change the shape of the originally-defined cooling hole or passage. In fluid-guided (and two-step) laser machining, both the substrate and any coating may be machined by a single guided laser system, allowing either the metering or the diffusion portion of the hole to be formed in a combination of the substrate and the coating.

These techniques are also applicable in thinner substrates, for example in tip regions of a rotor blade, where other techniques are unable to form both a metering portion and a diffusion portion on a cooling hole, due to the thin substrate. These techniques may also be applied to repair and refurbishment, where a fluid-guided (or two-step) laser system is used to restore cooling holes or passages in components where the original coating has been stripped, or stripped and restored. In some cases, these techniques may also be utilized to provide a diffusion portion on a cooling hole where the original part did not have a diffusion portion, but instead had only a metering portion subject to coat-down.

Guided laser techniques can also be used both for original part manufacture and in refurbishment and repair, as described above. In addition, these techniques can be used to restore or provide cooling holes with metering or diffusion features in a combination of substrate and coating materials.

Figure 23:
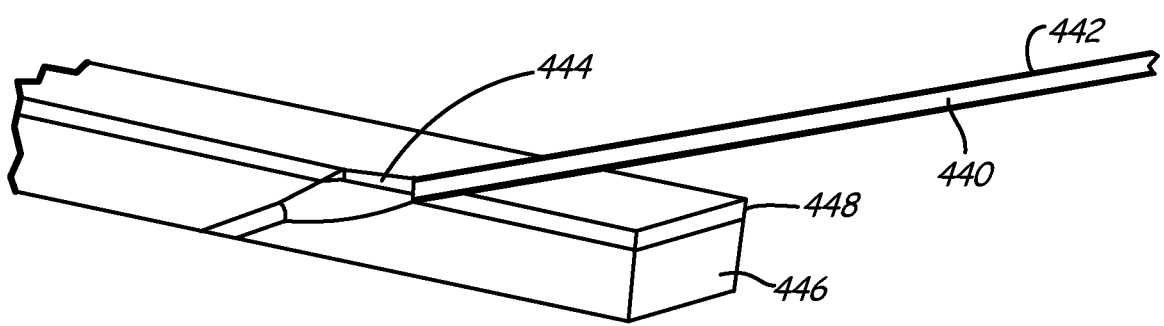
FIG. 23 is an illustration of a fluid-guided laser machining process.

FIG. 23 is an illustration of a fluid-guided laser machining process. In this process, laser (or laser beam) 440 is guided within fluid jet 442, as described above. Fluid jet guided laser 440 machines cooling hole 444 in a component for a gas turbine engine, for example a component with substrate 446 and coating 448. In general, substrates 446 may be formed of high temperature metals such as superalloys, and coatings 448 take a variety of forms including metal coatings such as a bond coating, and non-metal coatings such as a ceramic thermal barrier coat.

Figure 24A:
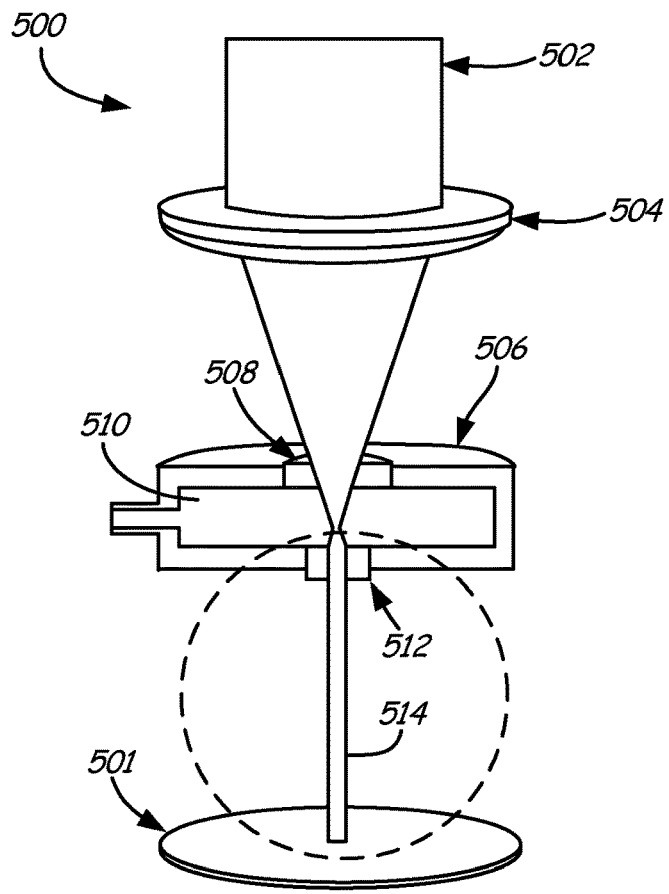
FIG. 24A is an illustration of a water jet/laser coupled machining process.
Figure 24B:
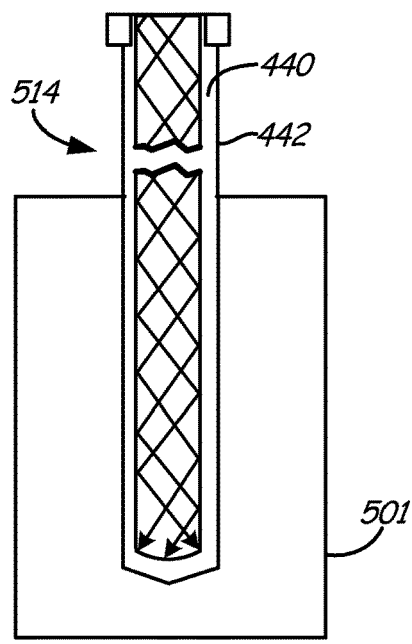
FIG. 24B is an alternate illustration of a water jet/laser coupled machining process.

FIGS. 24A and 24B are illustrations of a water jet/laser coupled machining process 500. Process 500 is performed on workpiece 501 with laser beam 502, lens 504, water (or fluid) chamber 506, window 508, fluid 510 (e.g., water at 20-500 bar) and nozzle 512 for generating fluid-guided laser beam/fluid jet 514. Fluid-guided laser beam/fluid jet 514 includes laser beam 440 inside fluid jet 442, as described above.

As shown in FIGS. 24A and 24B, no continuous focus adjustment is required because the diameter of fluid stream 442 dictates the spot size of laser beam 440. The heat affected zone in workpiece 501 is also minimal, due to the cooling effect of fluid stream 442. In addition, fluid stream 442 prevents particle deposition, contamination and burr formation on workpiece 501 during application of fluid-jet guided laser machining process 500.

Fluid-guided laser machining process 500 is an appropriate technique for machining cooling passages with diffuser portions in gas turbine engine components and other workpieces 501 made of suitable metals and metal alloy substrates, with or without coatings, and for forming other cooling hole structures in other components formed of metals, metal alloys and metal and non-metal coatings. For example, an IR laser beam 440 may be coupled into fluid guiding chamber 506, which provides a steady water (or other fluid) jet 442 to guide laser beam 440 during machining of substrate and coating surfaces on workpiece 501. The diameter of fluid stream 442 can be increased or decreased to manipulate the focal spot size of laser beam 440, determining the machining width for fluid-guided laser machining process 500.

Figure 25A:
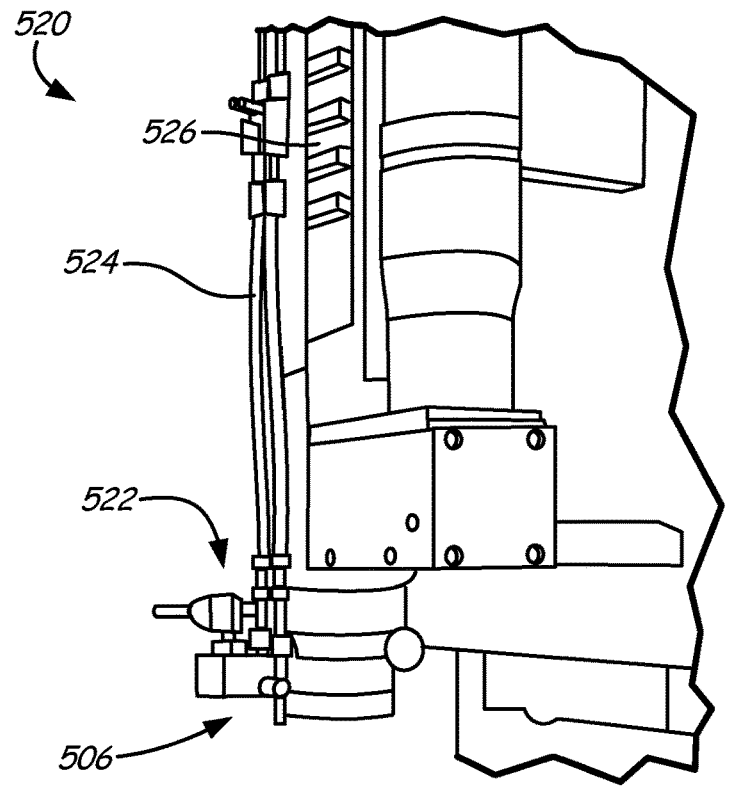
FIG. 25A is an illustration of a water jet/laser coupled machining apparatus.
Figure 25B:
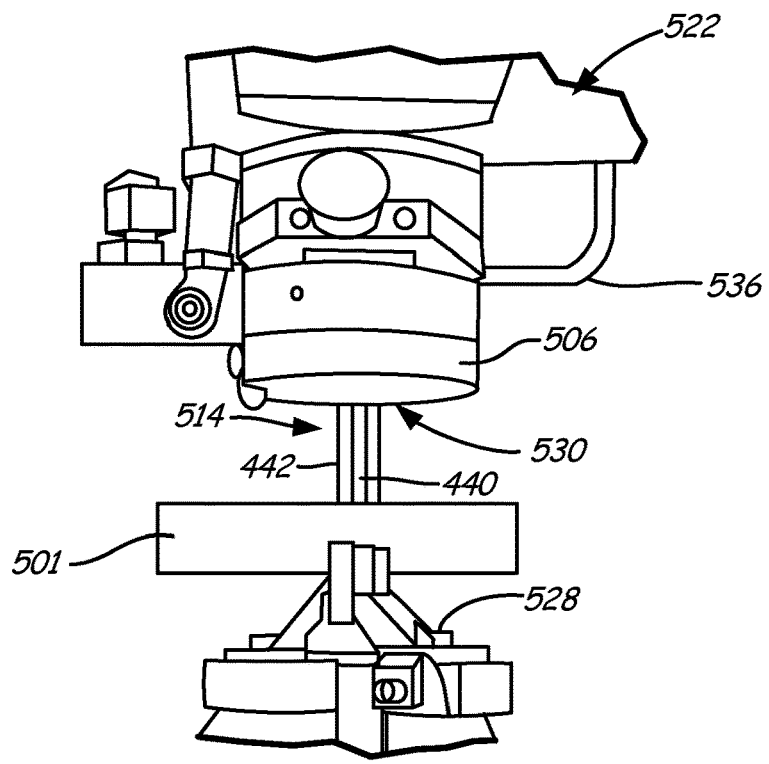
FIG. 25B is an alternate illustration of a water jet/laser coupled machining apparatus.

FIGS. 25A and 25B are illustrations of water jet/laser coupled machining system (or apparatus) 520. System 520 includes laser head 522 with coupling unit (fluid chamber) 506, fluid supply lines 524 and laser generator 526. Workpiece 501 (FIGS. 24A and 24B) can be coupled to clamping fixture 528, or another workpiece fixture.

The laser power delivered by system 520 through fluid-jet guided stream 514 can effectively machine cooling hole and diffuser shapes into both coated and uncoated workpieces 501, including workpieces 501 formed of superalloys and other aerospace alloys, with a variety of metallic and non-metallic coatings. Manipulation of the diameter of fluid stream 442 controls the power density of laser beam 340 on the surface of workpiece 501, providing precise machining capability.

Energy in laser beam 440 energy exits jet orifice 512 on fluid guiding chamber 506, which defines the quality and performance of fluid-jet guided (or laser coupled) stream 514. A high optical quality, high pressure window 508 may be located on top of fluid chamber 506, further improving the machining capability of fluid-jet guided laser system 520, for better cooling hole geometry and additional cooling efficiency.

Electron Beam Machining of Multi-Lobed Diffuser Holes

In electron beam (EB) or electron beam epitaxy machining methods, an electron beam is used for machining. Alternatively, a molecular or ion beam may be used.

Electron beam (and other focused beam) machining techniques typically utilize a continuous beam, suitable for forming passages in both metal substrate and non-metal coating materials, and in metallic coating materials. Alternatively, a pulsed beam is used, or a beam with a modulated power spectrum.

For example, a beam of electrons may be used to remove thermal barrier and other coating materials, and to remove bond coating, substrate and other metal materials, in a single cutting, drilling or machining step. Alternatively, an electron beam can be used to remove materials from a coating independently of a substrate, or from a substrate independently of a coating. For these purposes, a metallic bond coating may be described as part of the metal substrate, or part of a thermal barrier coating or other coating system.

Electron beam machining utilizes a focusing or "optics" system based on electromagnetic effects, for example using magnetic coils or charged plates to form and direct the beam. The beam size is controlled by the focusing system, allowing passages and holes of various sizes to be formed in a single process. In some designs, independent x and y coordinates (e.g., lateral and transverse beam widths) can be independently controlled, in order to produce a variety of different circular and elliptical or oblate beam spots for machining.

Typically, electron beam machining utilizes a vacuum system to reduce collisions with the air. In some designs, the level of vacuum can be controlled to vary the beam focusing or beam size. This allows electron beam techniques to provide tight corner radii for precision inlet, outlet, transition, metering and diffusion feature formation, or a larger beam size for increased flow area.

Electron beam techniques can be used both for original part manufacture and in refurbishment and repair, as described above. In addition, electron beam techniques can be used to restore or provide cooling holes with metering or diffusion features in a combination of substrate and coating materials.

Figure 26A:
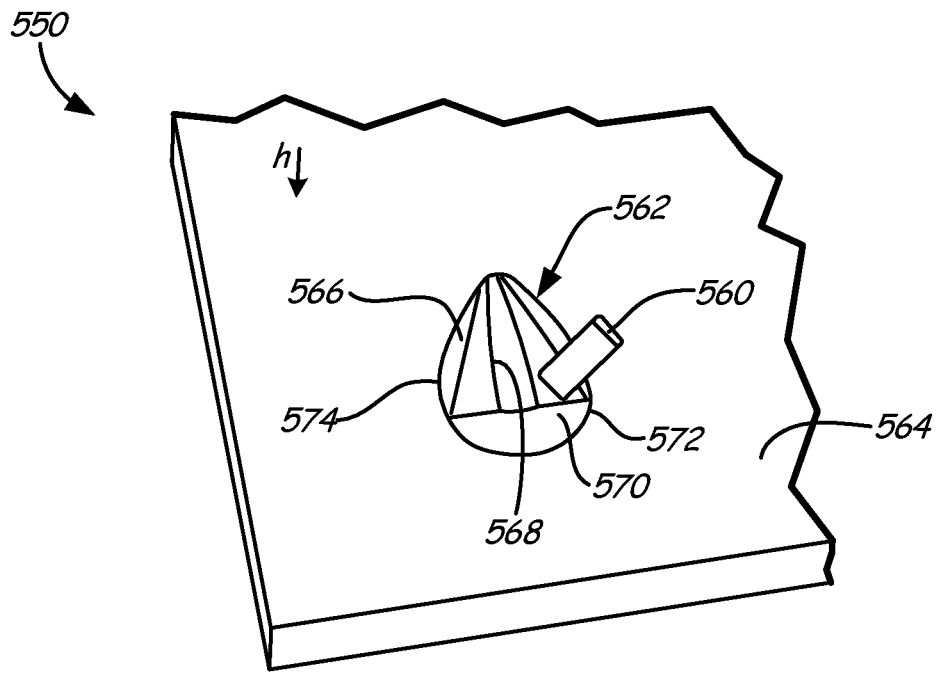
FIG. 26A is an illustration of a shaped beam machining process.

FIG. 26A is an illustration of shaped beam machining process 550. In this process, shaped beam 560 is used to form cooling hole 562 in hot gas path surface 564, for example a surface exposed to hot gas or working fluid flow in a gas turbine engine. The profile of shaped beam 560 is defined by focusing, and may be circular, elliptical or oblate, or have another shape. Hot gas path surface (or wall) 564 may be formed as a surface of a substrate, or a coated surface of a substrate.

In this particular example, cooling hole 562 has a multi-lobe diffusion portion, with lobes 566 separated along longitudinal ridges or dividers 568. Trailing edge 570 may be substantially straight, transverse to hot gas flow h, or trailing edge 572 may be convex, extending in a downstream sense between the lateral walls of outlet 574.

Figure 26B:
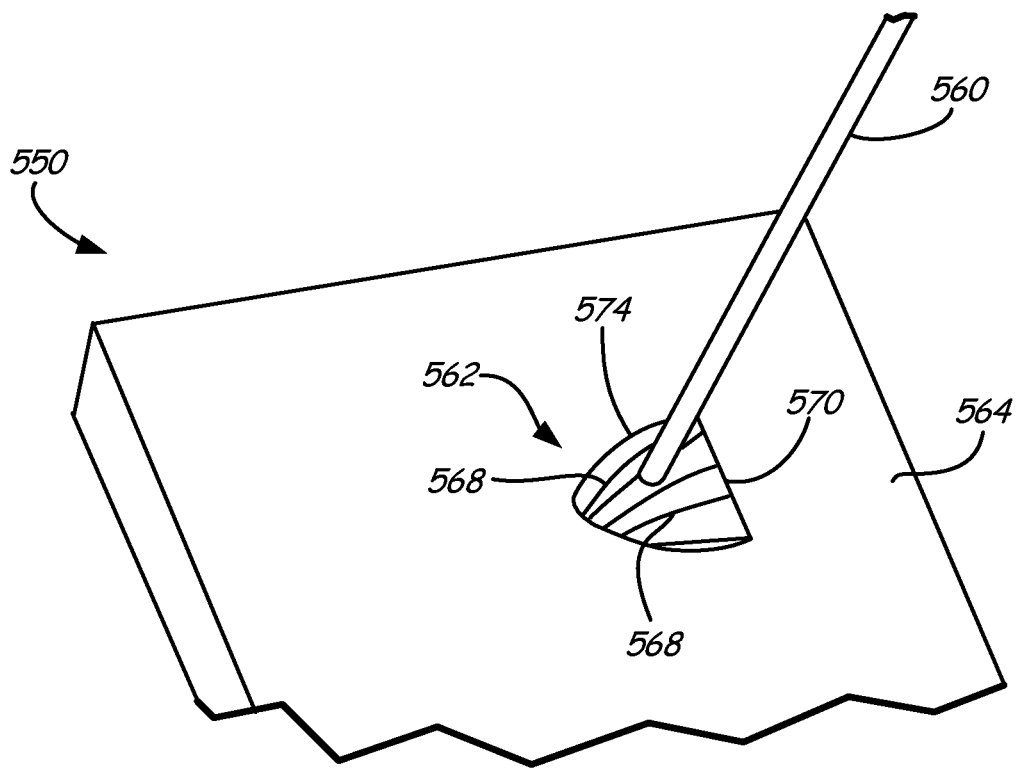
FIG. 26B is an alternate illustration of a shaped beam machining process.

FIG. 26B is an alternate illustration of shaped beam machining process 550. In this process, shaped beam 560 has a more circular profile, and is positioned to machine lobe 568 and ridge 570 along a different machining axis.

Figure 27A:
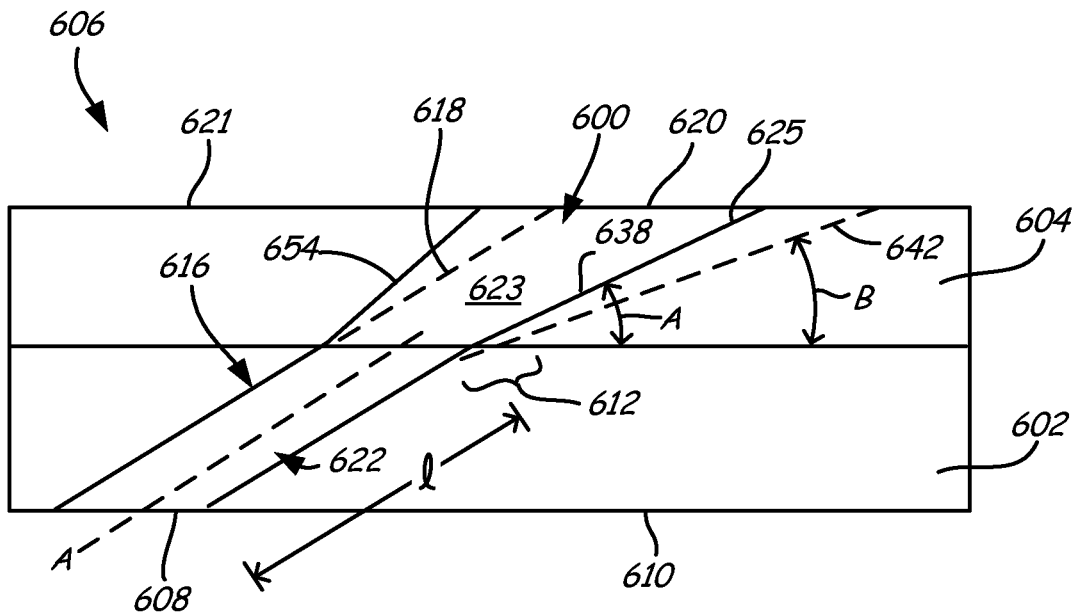
FIG. 27A is a schematic view of a cooling passage formed in a substrate and coating layer.

FIG. 27A is a schematic view of a cooling passage formed in a substrate and coating layer. Cooling passage 600 is formed in a combination of substrate 602 and coating layer 604 of component 606, for example by two-step laser machining, fluid-guided laser machining, or shaped beam machining, as described above. Cooling hole (or cooling passage) 600 is formed with metering section 622 along axis A, with substantially constant or decreasing cross sectional flow area from inlet 608 along cool surface 610 of component 606 to transition (or transition region) 612.

In this particular example, upstream wall 616 extends substantially parallel to axis A from inlet 608 through metering portion 622 to transition 612. In some designs, longitudinal ridge or divider process 618 extends from transition 612 to outlet 620 in hot surface 621, extending away from upstream wall 654 in diffusion portion 623, for example to divide diffusion portion 623 into lobes to decrease swirl flow and improve cooling efficiency. In some designs, longitudinal ridge or divider process 642 extends from transition 612 to outlet 620 in hot surface 621, extending away from downstream wall 642 in diffusion portion 623, for example to divide diffusion portion 623 into lobes to decrease swirl flow and improve cooling efficiency.

Figure 27B:
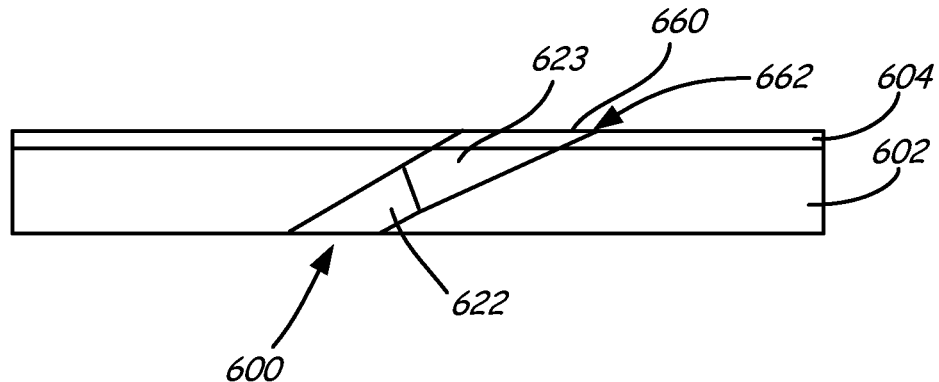
FIG. 27B is an alternate view of the cooling passage.

FIG. 27B is an alternate views of the cooling passage, showing exit portion 660 extending to trailing edge 662. In some designs, exit portion 660 is substantially flat, and in other designs exit portion 660 is substantially arcuate or curved. As shown in FIG. 27B, the machining techniques described here may be used to form cooling hole 600 with metering portion 622 in substrate 602 and diffusion portion 623 in a combination of substrate 602 and coating 604, in a variety of cusped, ridged and lobed configuration, as described above.

Mechanical Machining

In some embodiments, mechanical machining is used to produce cooling holes. Metering sections, diffusing sections or both metering and diffusing sections can be mechanically machined. Mechanical machining includes, but is not limited to, drilling, milling, grinding and superabrasive machining. Small diameter, high-speed tools are generally used to machine cooling holes. The tools used can be constructed of carbides, high-speed steel and any other material strong enough to drill, mill or grind the wall and/or thermal barrier coating applied to the wall. The tools used for mechanical machining can have diameters as small as 0.254 mm (0.01 inches) in order to form the various features of the diffusing section such as the lobes and ridges. Future developments may provide tool diameters smaller than 0.254 mm (0.01 inches).

Figure 28A:
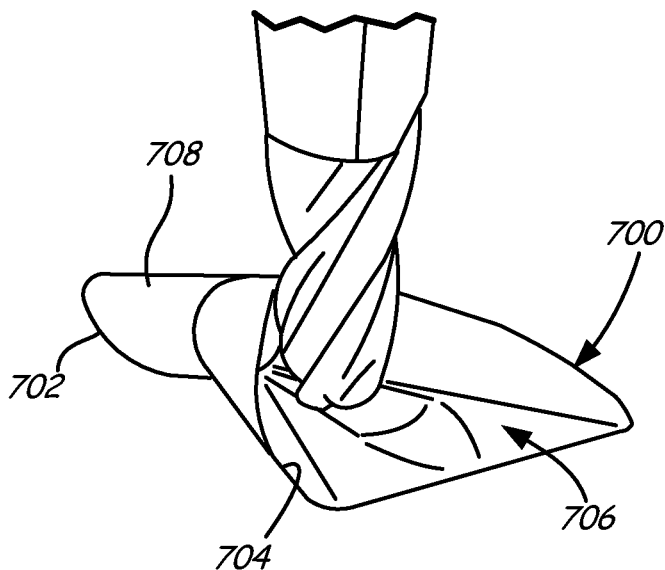
FIGS. 28A, 28B and 28C are schematic views of a cooling passage formed using mechanical machining.
Figure 28B:
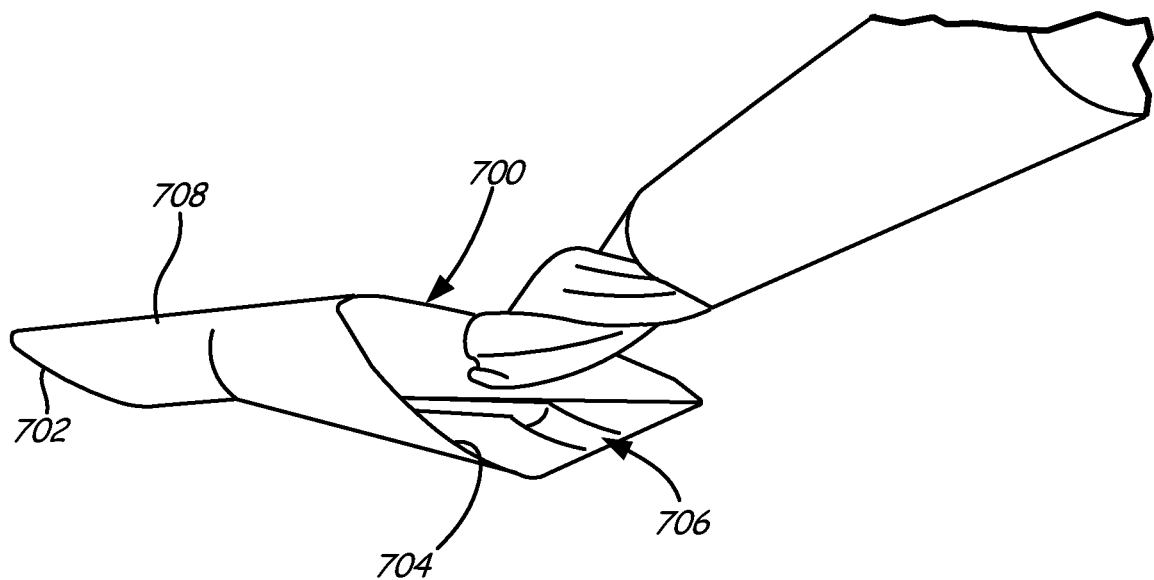
Figure 28C:
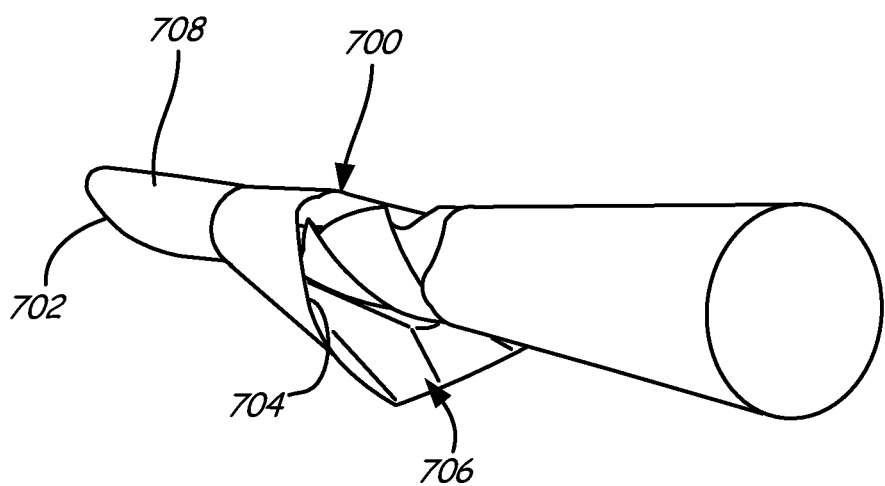

FIGS. 28A, 28B and 28C show images illustrating one method in which mechanical machining is used to produce a cooling hole. FIGS. 28A, 28B and 28C illustrate a method where mechanical machining is used to form both the metering and diffusing sections of cooling hole 700. In FIGS. 28A, 28B and 28C, the wall of the component has been cut away to better illustrate cooling hole 700. First, diffusing section 706 is formed by drilling or machining. As shown in FIGS. 28A, 28B and 28C, diffusing section 706 is drilled or machined from outlet side 704 of the wall and formed by machining the various lobes and surfaces of diffusing section 706. FIGS. 28A, 28B and 28C show the diffusing section formed with a milling cutter. Diffusing section 706 is produced using drilling, milling, grinding, superabrasive machining or any combination thereof. Once diffusing section 706 has been formed, metering section 708 is drilled. Metering section 708 can be drilled from either inlet side 702 or outlet side 704 of the wall. Metering section 708 can be formed before or after diffusing section 706. Metering section 708 and diffusing section 706 can be formed on a wall without a coating or before or after application of a coating such as a thermal barrier coating.

Mechanical machining can be combined with other techniques described herein to form cooling holes. For example, in one embodiment, laser drilling as described above is used to form the metering section and mechanical machining is used to form the diffusing section. The beam used to produce the metering section can first pass through either wall surface (i.e. drilled from either side of the wall). The diffusing section can then be formed by machining the various lobes and surfaces of the diffusing section. As noted above, the diffusing section can be produced using drilling, milling, grinding, superabrasive machining or any combination thereof. The combined laser/machining method can be performed on a wall without a coating or before or after application of a coating such as a thermal barrier coating.

Alternatively, mechanical machining can be used to form the metering section and a laser or electron beam can be used to form the diffusing section. The metering section is produced using drilling, milling, grinding, superabrasive machining or any combination thereof. The metering section can be drilled or machined from either wall surface (e.g., drilled from either side of the wall). The diffusing section can then be produced using a laser or electron beam to form the various lobes and surfaces of the diffusing section as described above. The combined machining/laser method can be performed on a wall without a coating or before or after application of a coating such as a thermal barrier coating.

In some embodiments, cooling holes are formed in gas turbine engine components having no cooling holes. In these situations, the mechanical machining operation can be mapped to the specific component to generate the desired arrangement of cooling holes. In some embodiments, mechanical machining can also be used to repair or refurbish components with previously existing cooling holes. In these situations, a scanner or physical probe can be used to determine the location of existing cooling holes that require repair. Suitable scanners include, but are not limited to, laser scanners, optical scanners and blue or white light scanners. Where a thermal barrier coating or other coating has been applied to the component during repair or refurbishment and prior to machining, mechanical machining methods and combined methods can be used to generate a hole having the same shape as the previously existing cooling hole. Alternatively, mechanical machining methods can be used to create a different cooling hole shape in the coating.

In some embodiments, mechanical machining methods are used to remove "coat down" from previously drilled holes. Coat down occurs when a thermal barrier coating or other coating is applied to a wall surface having preexisting holes. Some of the coating applied to the wall surface can enter the hole openings and travel down into the holes to partially or completely fill the holes. Mechanical machining methods can be used to remove the coating from the cooling holes.

Masking

In some embodiments, masking techniques are used to produce a portion of cooling holes. In masking, a solid mask is positioned within a partially formed hole. The solid mask is shaped to form the outline of a cavity, such as a cooling hole. A coating is applied around the solid mask. Once coating is complete, the mask is removed leaving a cavity having the shape of the mask in the coating layer.

Masking can be used to create cooling hole features in thermal barrier coatings or other coating on a component wall (hereinafter referred to as a thermal barrier coating 158). Depending on the component, portions of the metering section, portions of the diffusing section or a combination of portions of both the metering section and the diffusing section can be formed within thermal barrier coating.

Figure 29A:
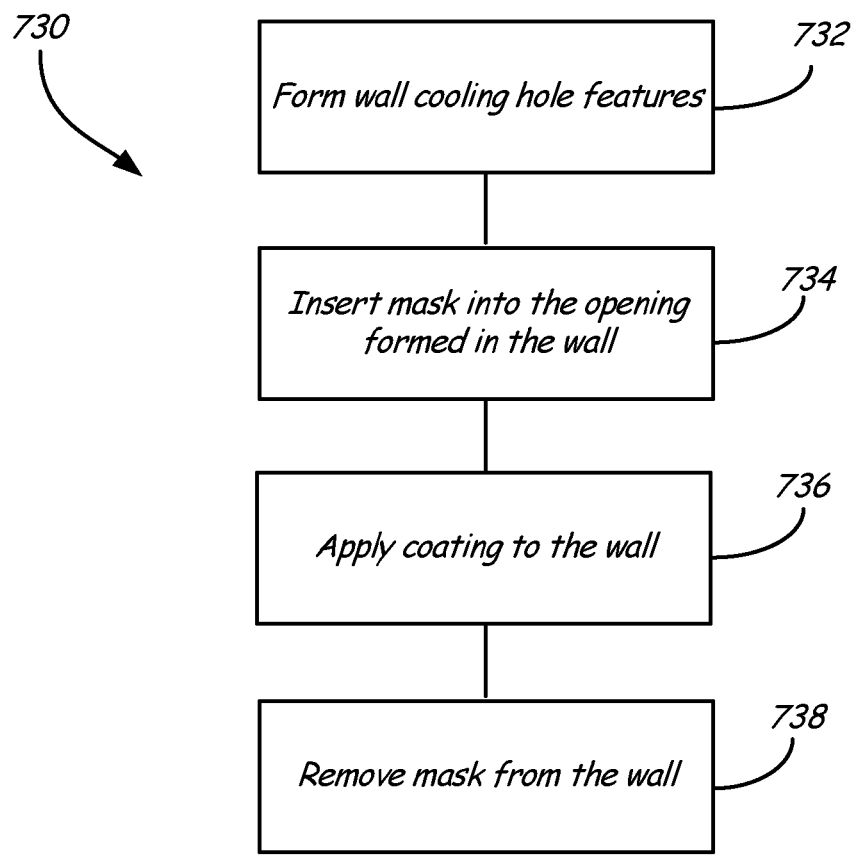
FIG. 29A is a simplified flow diagram illustrating a method for forming cooling passages using masking.
Figure 29B:
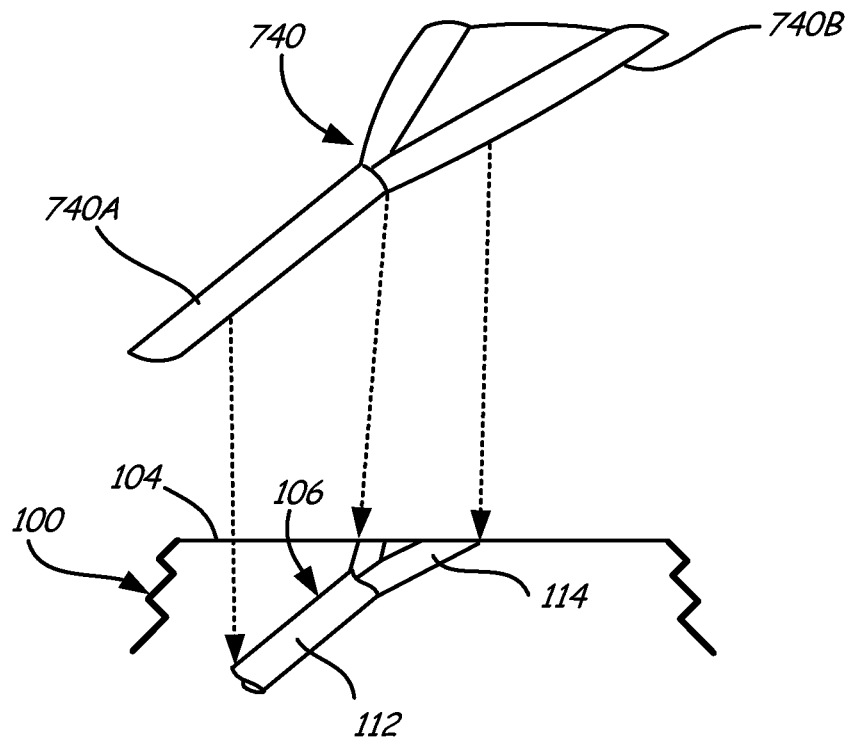
FIGS. 29B, 29C and 29D are schematic views of a cooling passage formed using masking.

FIG. 29A illustrates one embodiment of a method where masking is used to form the diffusing section of a cooling hole. Method 730 will be described with further reference to FIGS. 29B, 29C and 29D. In method 730, the wall cooling hole features are formed in step 732. In this embodiment, features of the cooling hole present in the wall are formed prior to masking. As shown in FIG. 29B, metering section 112 and a portion of diffusing section 114 are formed in wall 100. Metering section 112 is formed by any suitable method in step 732. As described above, suitable methods include mechanical machining, electron beam machining, fluid jet guided laser machining or laser drilling or machining. Metering section 112 can be drilled or machined from either first wall surface 102 or second wall surface 104. The portion of diffusing section 114 shown below second wall surface 104 is also formed by any suitable method in step 732. As described above and below, suitable methods include mechanical machining, electron beam machining, fluid jet guided laser machining or laser drilling or machining.

Figure 29C:
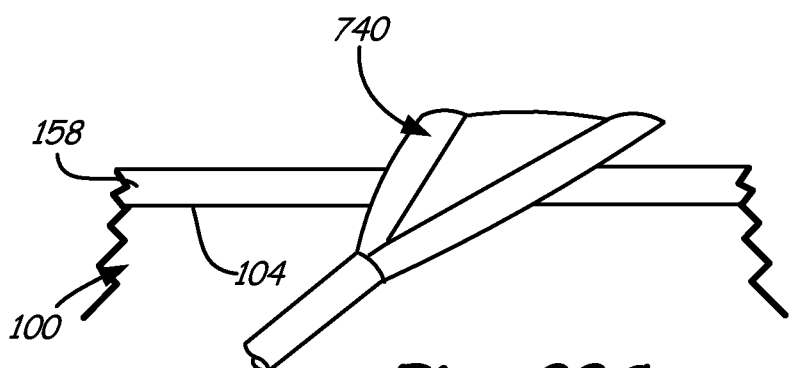

In step 734, a mask is inserted into the wall cooling hole features. Mask 740 (shown in FIG. 29B) is shaped to fit into cooling hole 106 in wall 100. Mask 740 includes first end 740A, which is shaped to be positioned through metering section 112. Mask 740 also includes second end 740B, which is shaped to provide the desired cavity within thermal barrier coating 158. Mask 740 is inserted into cooling hole 106 from the side of wall 100 that will receive thermal barrier coating 158 (second wall surface 104, as shown in FIG. 29C). Mask 740 can be inserted by hand or placed by a machine. Once mask is inserted into the wall cooling hole features, a portion of first end 740A is positioned within metering section 112, a portion of second end 740B is positioned within diffusing section 114 present in wall 100 and a portion of second end 740B extends above second wall surface 104. In some embodiments, first end 740A extends all the way through metering section 112 and past first wall surface 102. The portion of second end 740B extending above second wall surface 104 is shaped to provide the desired cavity within thermal barrier coating 158. In addition, mask 740 may be removed mechanically, for example by mechanical means or by hand, as well as removed by another process such as a chemical process.

Mask 740 can be constructed of various materials. However, mask 740 must be made of a material dissimilar from wall 100 and thermal barrier coating 158. In some embodiments, mask 740 is a refractory metal. Refractory metals are a class of metals that are extraordinarily resistant to heat and wear. Refractory metals include niobium, molybdenum, tantalum, tungsten, rhenium, titanium, vanadium, chromium, zirconium, hafnium, ruthenium, osmium and iridium. In some embodiments, a combination of refractory metals is used to form mask 740. In one embodiment, mask 740 is molybdenum.

Once mask 740 has been inserted into wall 100 in step 734, thermal barrier coating 158 is applied to wall 100. In step 736, thermal barrier coating 158 is applied to second wall surface 104 as shown in FIG. 29C. Thermal barrier coating 158 can be applied to wall 100 by various methods. Suitable methods include, but are not limited to, air plasma spraying and electron beam plasma vapor deposition. As thermal barrier coating 158 is applied, the presence of mask 740 prevents thermal barrier coating 158 from entering cooling hole 106. Additionally, thermal barrier coating 158 "fills in" around second end 740B of mask 740. Thermal barrier coating 158 in the vicinity of mask 740 forms features that complement the geometry of second end 740B. These complementary features form the desired cooling hole (cavity) shape in thermal barrier coating 158.

Figure 29D:
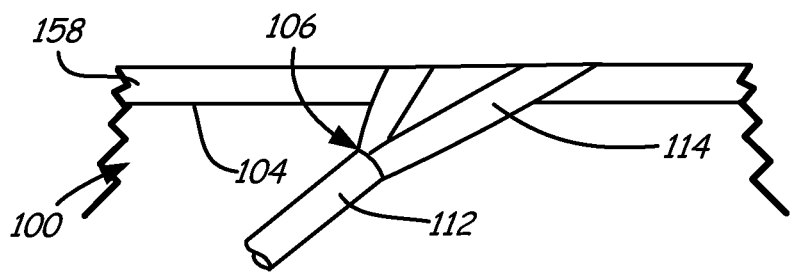

Once thermal barrier coating 158 has been applied to wall 100, the mask is removed. Mask 740 is removed from thermal barrier coating 158 and wall 100 in step 738. Mask 740 can be removed in step 738 by chemical removal, such as acid leeching, or other approaches. Once mask 740 is removed, cooling hole 106 is fully formed. As shown in FIG. 29D, metering section 112 and a portion of diffusing section 114 are formed in wall 100 while a portion of diffusing section 114 is formed in the thermal barrier coating layer (158).

In some embodiments, method 730 is used to form cooling holes in gas turbine engine components without holes. In these situations, the combined machining and masking operation can be mapped to the specific component to generate the desired arrangement of cooling holes. In some embodiments, method 730 can also be used to repair or refurbish components with previously existing cooling holes. In these situations, a scanner or physical probe can be used to determine the location of existing cooling holes that require repair. Suitable scanners include, but are not limited to, laser scanners, optical scanners and blue or white light scanners. Method 730 can be used to generate a hole having the same shape as the previously existing cooling hole. Alternatively, method 730 can be used to create a different cooling hole shape in the coating.

Figure 30A:
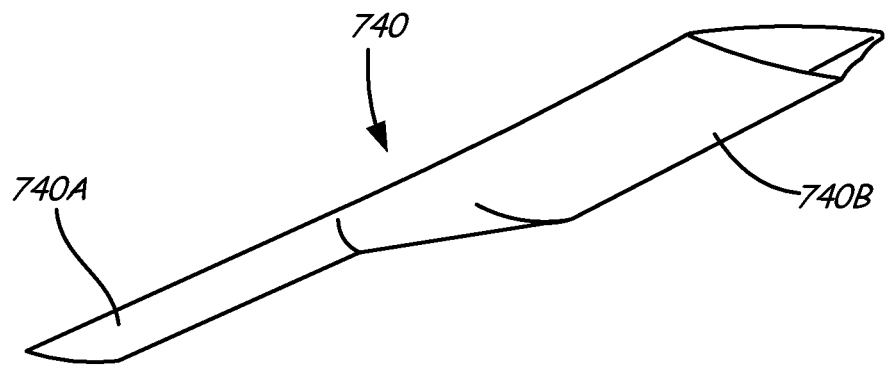
FIGS. 30A, 30B, 30C and 30D are alternate schematic views of a cooling passage formed using masking.
Figure 30B:
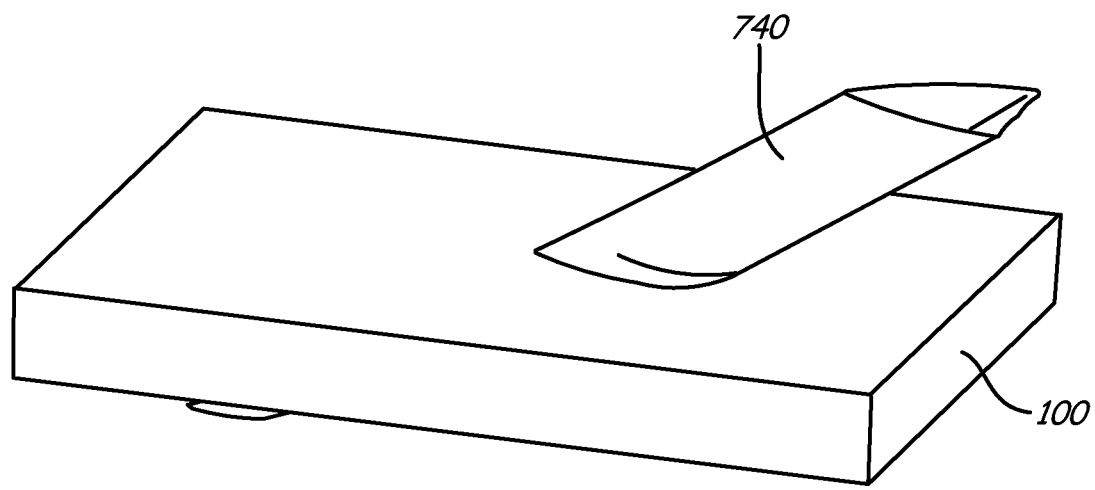
Figure 30C:
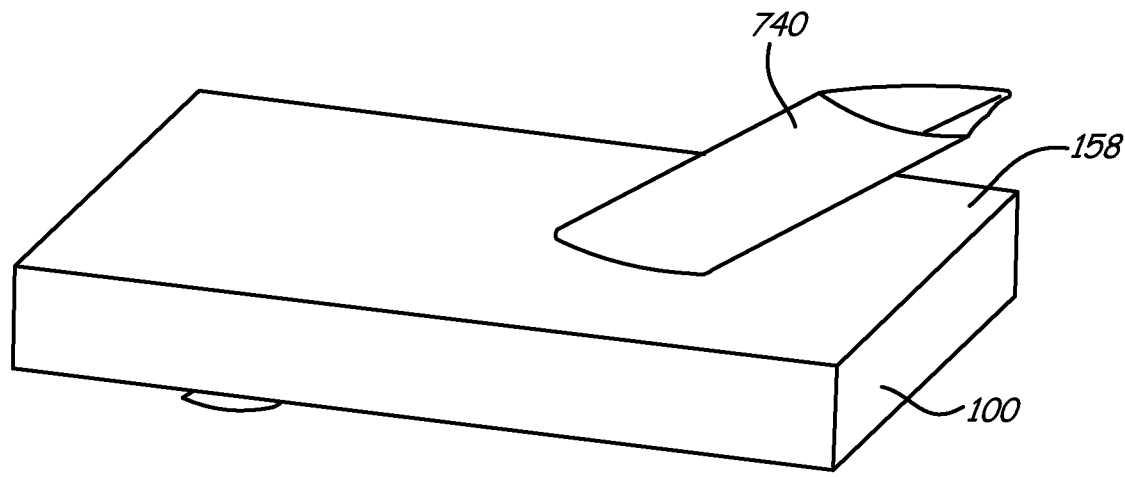
Figure 30D:
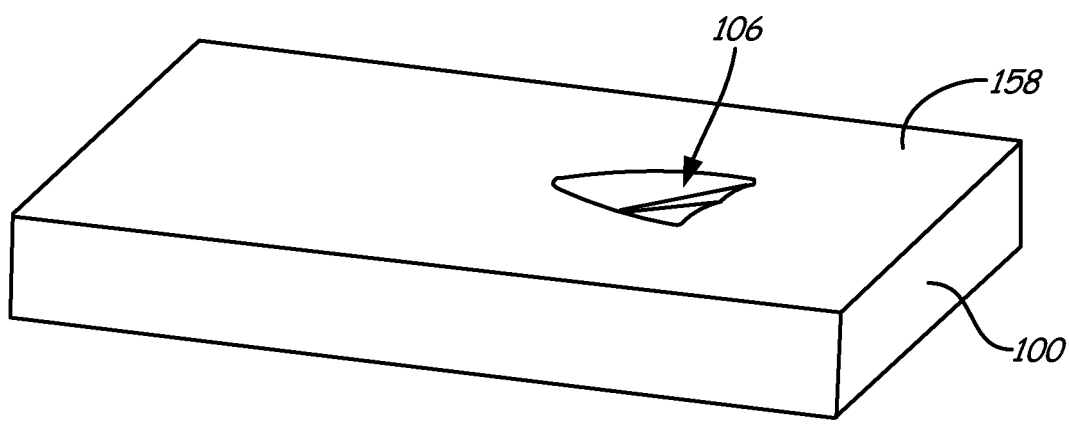

FIGS. 30A, 30B, 30C and 30D illustrate additional examples of a masking technique. FIG. 30A shows a perspective view of mask 740. FIG. 30B shows a perspective view of mask 740 positioned within a cooling hole in wall 100. FIG. 30C shows a perspective view of thermal barrier coating 158 applied to wall 100 with mask 740 in place. FIG. 30D shows a perspective view of cooling hole 106 in wall 100 and thermal barrier coating layer 158 formed by masking.

As used throughout this disclosure, the term coating includes abrasion coatings, abrasive coatings, thermal barrier coatings, bond coatings and other coating systems such as urethane or polymer coatings. Thermal barrier coatings include ceramic coatings such as yttria-stabilized zirconia coatings, columnar ceramic coatings, and coatings made of refractory materials. Bond coatings include metallic bond coatings, which may be machined either as part of a metallic substrate, or as part of a non-metallic coating.

As used throughout this disclosure, the terms passages and holes include cooling holes, cooling passages and cooling holes with a combination of one or more inlet, metering, transition, diffusion and outlet portions. The passage geometry varies with respect to cross section and shape in the inlet and metering portions, extending from the inlet through any metering section to any transition region. Moreover, the geometry may vary along a particular cooling hole, for example from a rounded cusped (or bicuspid) shape to a more oblate or crescent shape, or to a single-cusp shape, for example where one or more cusp processes merge, or to an oval or round or oblate cross sectional shape, for example where one or more cusp processes terminate.

In some designs, the cross section, shape and geometry of the diffusion portion may also vary according to any of these configurations. The outlet and diffusion geometry is also selected to improve cooling performance, including the geometry along the trailing edge of the outlet. The outlet may be formed as a delta with arcuate upstream wall and substantially straight trailing edge, transverse to the hot gas flow. A delta outlet may also be configured with a more or less convex trailing edge, having a central portion extending downstream along a hot flow path surface.

The holes or passages may include longitudinal ridge or divider processes and cusp processes. One or both of the ridges and cusps may be formed as long, narrow features extending along the wall of a cooling passage, for example where two sloping sides or lobes meet, or as a narrow raised band or rib structure. Ridges and cusps may also be either substantially pointed or rounded, for example where two curved lobe or wall surfaces meet, or where the direction of curvature reverses along the wall of cooling passage. Ridges and cusps may also be formed as arched or cone-shape features, for example at the boundary of two lobes.

All of these inlet, metering, transition, diffusion and outlet configurations may be selected to reduce separation and increase attachment and laminar flow. All of these inlet, metering, transition, diffusion and outlet configurations may be selected for improved coverage and cooling efficiency along a hot flow path surface, for example along a gas path wall of a turbine component.

All the systems, manufacturing apparatuses and process steps described here can be applied or performed in any order. All the systems, manufacturing apparatuses and process steps described here can be applied to original equipment manufacture components and to parts being repaired, including original and repaired or replacement parts and components for gas turbine engines.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

Discussion of Possible Embodiments

The following are non-exclusive descriptions of possible embodiments of the present invention.

A method for producing a diffusion cooling hole extending between a wall having a first wall surface and a second wall surface can include forming a cooling hole inlet at the first wall surface, forming a cooling hole outlet at the second wall surface, forming a metering section downstream from the inlet and forming a multi-lobed diffusing section between the metering section and the outlet. The inlet, outlet, metering section and multi-lobed diffusing section can be formed by laser drilling, particle beam machining, fluid jet guided laser machining, mechanical machining, masking and combinations thereof.

The system of the preceding paragraph can optionally include, additionally and/or alternatively any, one or more of the following features, configurations and/or additional components:

the wall can include a metal or superalloy substrate;

the second wall surface can include a coating, and at least a portion of the cooling hole can extend through the coating;

the coating can include a bond coating and a thermal barrier coating;

a portion of the diffusing section can be located within the coating;

the entire diffusing section can be located within the coating;

a portion of the metering section can be located within the coating;

the inlet and metering section can be formed using a first laser having a frequency between about 5 Hz and about 200 kHz and a millisecond ($10^{-3}$) to nanosecond ($10^{-9}$) pulse duration range, and the multi-lobed diffusing section and outlet can be formed using a second laser having a frequency between about 1 kHz and about 200 kHz and a pulse duration range from nano ($10^{-9}$) to femto ($10^{-15}$) seconds;

the inlet, metering section, multi-lobed diffusing section and outlet can be formed using a fluid jet guided laser;

the inlet, metering section, multi-lobed diffusing section and outlet can be formed using a particle beam;

the particle beam can be an electron beam;

the particle beam can be an ion beam or molecular beam;

the inlet, metering section, multi-lobed diffusing section and outlet can be formed by a technique selected from the group consisting of drilling, milling, grinding, superabrasive machining and combinations thereof;

the inlet and metering section can be formed by drilling, and the multi-lobed diffusing section and outlet can be formed using a laser having a frequency between about 1 kHz and about 200 kHz and a pulse duration range from nano ($10^{-9}$) to femto ($10^{-15}$) seconds;

the inlet and metering section can be formed using a laser having a frequency between about 5 Hz and about 100 Hz, and the multi-lobed diffusing section and outlet can be formed by a technique selected from the group consisting of drilling, milling, grinding, superabrasive machining and combinations thereof;

the outlet and the portion of the diffusing section extending through the coating can be formed by masking;

the metering section and the diffusing section can be formed using different techniques;

the inlet and the metering section can be formed before the diffusing section and the outlet; and/or the inlet and the metering section can be formed after the diffusing section and the outlet.

A method for producing a diffusion cooling hole extending between a wall having a first wall surface and a second wall surface can include forming a cooling hole inlet at the first wall surface, forming a cooling hole outlet at the second wall surface, forming a metering section downstream from the inlet and forming a multi-lobed diffusing section between the metering section and the outlet. The inlet and metering section can be formed by a first technique selected from the group consisting of laser drilling, particle beam machining, fluid jet guided laser machining, mechanical machining and masking. The outlet and multi-lobed diffusing section can be formed by a second technique different from the first technique and selected from the group consisting of laser drilling, particle beam drilling, fluid jet guided laser machining, mechanical machining and masking.

A method for repairing a component having a wall with multi-lobed diffusion cooling holes can include applying a new coating to the wall, locating the diffusion cooling hole to be repaired, forming a multi-lobed diffusing section and an outlet in the new coating to correspond with a metering section located in the wall. The multi-lobed diffusing section and the outlet can be formed by a technique selected from the group consisting of laser drilling, particle beam machining, fluid jet guided laser machining, mechanical machining, masking and combinations thereof.

The system of the preceding paragraph can optionally include, additionally and/or alternatively any, one or more of the following features, configurations and/or additional components:

the method can, further include removing an existing coating from the wall prior to applying the new coating.

The invention claimed is:

1. A method for repairing a component having a wall with multi-lobed diffusion cooling holes, the method comprising:
  applying a new coating to the wall;
  locating the diffusion cooling hole to be repaired; and
  forming a multi-lobed diffusing section and an outlet downstream from the multi-lobed diffusing section in the new coating to correspond with a metering section located in the wall, the metering section being a flow area adjacent and downstream from an inlet between the inlet and the multi-lobed diffusing section, wherein forming the multi-lobed diffusing section comprises:
    forming a first lobe that diverges longitudinally and laterally from the metering section and has a trailing edge;
    forming a second lobe that diverges longitudinally and laterally from metering section and has a trailing edge; and
    forming an interlobe region that extends from the first lobe to the second lobe such that the interlobe region diverges laterally in a downstream direction, the interlobe region comprising:
      a downstream end adjacent the outlet, wherein an entirety of the downstream end extends at least to the trailing edges of the first lobe and the second lobe;
      a first inclined portion adjacent to and extending from a bottom surface of the first lobe;
      a second inclined portion adjacent to and extending from a bottom surface of the second lobe; and
      a ridge that extends longitudinally within the interlobe region and is between the first lobe and the second lobe at an intersection of the first inclined portion and the second inclined portion, wherein the first inclined portion and the second inclined portion meet together to form the ridge;
  wherein the multi-lobed diffusing section and the outlet are formed by a technique selected from the group consisting of laser drilling, particle beam machining, fluid jet guided laser machining, mechanical machining, masking and combinations thereof.

2. The method of claim 1, further comprising:
  removing an existing coating from the wall prior to applying the new coating.

3. The method of claim 1, wherein locating the diffusion cooling hole to be repaired includes using a scanner or physical probe.

4. The method of claim 3, wherein the scanner is a laser scanner, an optical scanner, a blue light scanner, or a white light scanner.

5. The method of claim 1, further including removing preexisting coating from the cooling hole.

6. The method of claim 1, wherein the wall comprises a metal or superalloy substrate.

7. The method of claim 1, wherein a surface of the wall comprises the new coating, and at least a portion of the cooling hole extends through the coating.

8. The method of claim 7, wherein the new coating comprises:
  a bond coating; and
  a thermal barrier coating.

9. The method of claim 8, wherein a portion of the multi-lobed diffusing section is located within the new coating.

10. The method of claim 9, wherein an entirety of the multi-lobed diffusing section is located within the new coating.

11. The method of claim 10, wherein a portion of the metering section is located within the new coating.

12. The method of claim 1, wherein the multi-lobed diffusing section and the outlet are formed by a technique selected from the group consisting of drilling, milling, grinding, superabrasive machining and combinations thereof.

13. The method of claim 1, wherein the outlet and a portion of the multi-lobed diffusing section extend through the new coating and are formed by masking.

14. A method for repairing a component having a wall with multi-lobed diffusion cooling holes, the method comprising:
  applying a new coating to the wall;
  locating the diffusion cooling hole to be repaired using a scanner or physical probe; and
  forming a multi-lobed diffusing section and an outlet in the new coating to correspond with a metering section located in the wall, the metering section being a flow area adjacent and downstream from an inlet between the inlet and the multi-lobed diffusing section, wherein forming the multi-lobed diffusing section includes:
    forming a first lobe that diverges longitudinally and laterally from the metering section and has a trailing edge;
    forming a second lobe that diverges longitudinally and laterally from the metering section and has a trailing edge; and
    forming an interlobe region that extends from the first lobe to the second lobe such that the interlobe region diverges laterally in a downstream direction, the interlobe region comprising:
      a downstream end adjacent the outlet, wherein an entirety of the downstream end extends at least to the trailing edges of the first lobe and the second lobe;
      a first inclined portion adjacent to and extending from a bottom surface of the first lobe;

a second inclined portion adjacent to and extending from a bottom surface of the second lobe; and a ridge that extends longitudinally within the inter-lobe region and is between the first lobe and the second lobe at an intersection of the first inclined portion and the second inclined portion, wherein the first inclined portion and the second inclined portion meet together to form the ridge wherein the multi-lobed diffusing section and the outlet are formed by a technique selected from the group consisting of laser drilling, particle beam machining, fluid jet guided laser machining, mechanical machining, masking and combinations thereof.

15. The method of claim 14, further comprising:

removing an existing coating from the wall prior to applying the new coating.

16. The method of claim 14, wherein locating the diffusion cooling hole to be repaired includes using a scanner or physical probe, wherein the scanner is a laser scanner, an optical scanner, a blue light scanner, or a white light scanner.

17. The method of claim 14, further including removing preexisting coating from the cooling hole.

18. The method of claim 14, wherein the wall comprises a metal or superalloy substrate.

* * * * *